United States Patent
Kuo et al.

(10) Patent No.: US 10,291,272 B2
(45) Date of Patent: *May 14, 2019

(54) COMMUNICATION SYSTEM AND METHOD OF DATA COMMUNICATIONS

(71) Applicant: TAIWAN SEMICONDUCTOR MANUFACTURING COMPANY, LTD., Hsinchu (TW)

(72) Inventors: Feng Wei Kuo, Zhudong Township (TW); William Wu Shen, Hisnchu (TW); Chewn-Pu Jou, Hsinchu (TW); Huan-Neng Chen, Taichung (TW); Lan-Chou Cho, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,453

(22) Filed: Jun. 4, 2018

(65) Prior Publication Data
US 2018/0278281 A1  Sep. 27, 2018

Related U.S. Application Data

(63) Continuation of application No. 15/417,457, filed on Jan. 27, 2017, now Pat. No. 9,991,917, which is a (Continued)

(51) Int. Cl.
| | |
|---|---|
| *H04B 1/10* | (2006.01) |
| *H04W 4/80* | (2018.01) |
| *H04W 84/12* | (2009.01) |

(52) U.S. Cl.
CPC ... *H04B 1/1027* (2013.01); *H04B 2001/1054* (2013.01); *H04W 4/80* (2018.02); *H04W 84/12* (2013.01)

(58) Field of Classification Search
CPC ......... H04B 1/1027; H04B 2001/1054; H04W 84/12; H04W 4/008; H04W 4/80
See application file for complete search history.

(56) References Cited

U.S. PATENT DOCUMENTS 5,691,666 A * 11/1997 Owen .................... H03D 3/003
329/319
5,717,772 A 2/1998 Lane et al.
(Continued)

*Primary Examiner* — Vineeta S Panwalkar
(74) *Attorney, Agent, or Firm* — Hauptman Ham, LLP

(57) ABSTRACT

A communication system includes a first amplifier configured to output an amplified modulated signal, and a demodulator coupled to the first amplifier. The demodulator is configured to demodulate the amplified modulated signal responsive to a first carrier signal. The demodulator includes a filter and a bandwidth adjusting circuit. The filter is configured to generate a filtered first signal based on a first signal and a set of control signals. The filter has a bandwidth adjusted based on the set of control signals. The bandwidth adjusting circuit is coupled to the filter, and is configured to generate the set of control signals based on a frequency of the filtered first signal and a frequency of the first signal. The bandwidth adjusting circuit includes a frequency detector configured to generate a second signal based on the frequency of the filtered first signal and the frequency of the first signal.

20 Claims, 11 Drawing Sheets

Related U.S. Application Data continuation of application No. 14/927,783, filed on Oct. 30, 2015, now Pat. No. 9,559,733.

(56) References Cited

U.S. PATENT DOCUMENTS

| | | | |
|---|---|---|---|
| 6,078,796 | A | 6/2000 | Ling |
| 8,279,008 | B2 | 10/2012 | Hsieh et al. |
| 8,427,240 | B2 | 4/2013 | Hsieh et al. |
| 8,593,206 | B2 | 11/2013 | Chen et al. |
| 8,610,494 | B1 | 12/2013 | Jin et al. |
| 8,618,631 | B2 | 12/2013 | Jin et al. |
| 9,191,243 | B2 | 11/2015 | Nguyen et al. |
| 2004/0213366 | A1* | 10/2004 | Ono .................. H04B 1/1036 375/348 |
| 2008/0019422 | A1 | 1/2008 | Smith |
| 2008/0076374 | A1 | 3/2008 | Grenader |
| 2011/0081877 | A1 | 4/2011 | Seendripu |
| 2012/0092230 | A1 | 4/2012 | Hung et al. |
| 2013/0234305 | A1 | 9/2013 | Lin et al. |
| 2014/0132333 | A1 | 5/2014 | Jin et al. |
| 2014/0139322 | A1 | 5/2014 | Wang et al. |
| 2014/0217546 | A1 | 8/2014 | Yen et al. |
| 2014/0253262 | A1 | 9/2014 | Hsieh et al. |
| 2014/0253391 | A1 | 9/2014 | Yen |

\* cited by examiner

COMMUNICATION SYSTEM AND METHOD OF DATA COMMUNICATIONS

PRIORITY CLAIM

The present application is a continuation of U.S. application Ser. No. 15/417,457, filed Jan. 27, 2017, now U.S. Pat. No. 9,991,917, issued Jun. 5, 2018, which is a continuation of U.S. application Ser. No. 14/927,783, filed Oct. 30, 2015, now U.S. Pat. No. 9,559,733, issued Jan. 31, 2017, which are incorporated herein by reference in their entireties.

BACKGROUND

In an electrical system, there are many integrated circuit (IC) chips arranged in one or more IC packages or many electrical devices, such as a memory, an analog-to-digital converter, wireless communication devices, or an application processor, in a chip. In some applications, data communications among different IC chips and/or different electrical devices are performed based on one or more communication protocols, such as a Serial Peripheral Interface (SPI) protocol or an Inter-Integrated Circuit ($I^2C$) protocol. A radio frequency interconnect (RFI) has been implemented that links the devices to perform communication between the devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
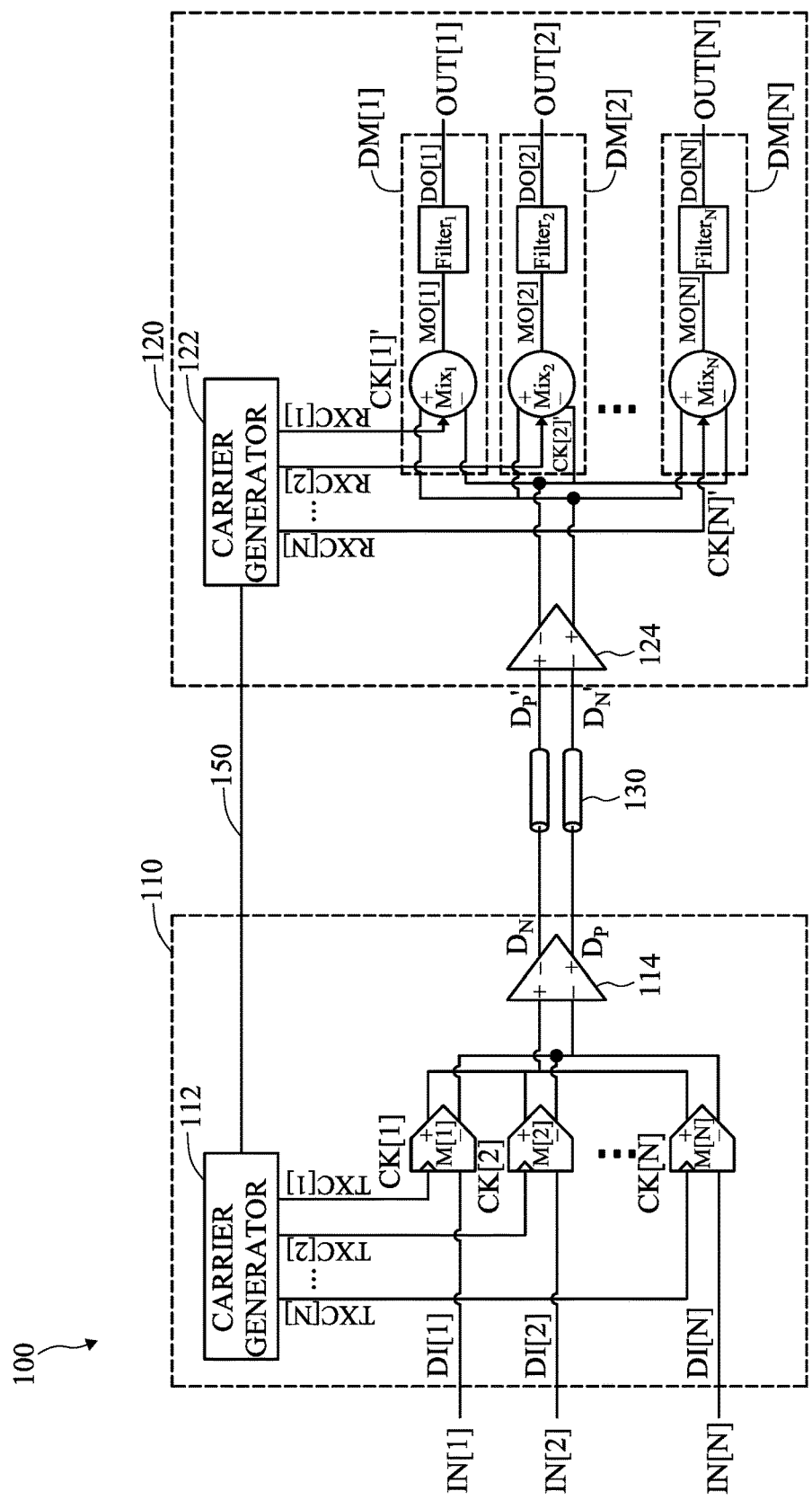
FIG. 1 is a block diagram of a data communication system, in accordance with some embodiments.

The following disclosure provides different embodiments, or examples, for implementing features of the provided subject matter. Specific examples of components and arrangements are described below to simplify the present disclosure. These are, of course, merely examples and are not limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The RFI discussed herein connects devices by a transmission line. In some embodiments, the individual components are on a single semiconductor substrate. In some embodiments, the individual components are on separate semiconductor substrates. In some embodiments, the devices include at least one of a memory device; a wireless communication device, e.g., a Bluetooth® module, a Zigbee® module, an IEEE 802.11 wireless networking module, or another suitable wireless communication device; an analog-to-digital converter, a digital-to-analog converter, a sensor module, a discrete application processor for performing operations in a low power state, a hardware processor, a memory controller, or another suitable device.

In accordance with some embodiments, a communication system includes a carrier generator configured to generate a first carrier signal and a demodulator configured to demodulate a modulated signal based on the first carrier signal. The demodulator includes a filter and a bandwidth adjusting circuit. The filter is configured to filter a first signal. The first signal is a product of the first carrier signal and the modulated signal. The filter has at least a first cutoff frequency and a bandwidth. The bandwidth of the filter is controlled by a set of control signals. The bandwidth adjusting circuit is configured to adjust the bandwidth of the filter based on a frequency of the filtered first signal and a frequency of the first signal, or a phase of the filtered first signal and a phase of the first signal. The bandwidth adjusting circuit is configured to generate the set of control signals.

Distortion introduced by the filter of the demodulator is compensated by adjusting the bandwidth of the filter. Distortion is attributed to process, voltage and/or temperature (PVT) variations of the demodulator. In some embodiments, compared with a receiver not using the bandwidth adjusting circuit, the receiver according to the present disclosure consumes less power by automatically adjusting the bandwidth and the output response of the filter. In some embodiments, the output response of the filter of the present disclosure is automatically adjusted to overcome PVT variations. In some embodiments, the output response of the filter of the present disclosure is consistent regardless of PVT variations.

FIG. 1 is a block diagram of a data communication system 100, in accordance with some embodiments. Data communication system 100 includes a transmitter 110, a receiver 120 and a transmission line 130. Transmission line 130 electrically couples transmitter 110 and receiver 120. In addition to transmission line 130, one or more channels 150 electrically couple transmitter 110 and receiver 120. In some embodiments, channel 150 is not used to electrically couple transmitter 110 and receiver 120. Data communication system 100 is configured to transmit data communications, signaling communications or command communications.

In some embodiments, transmitter 110 and receiver 120 are in different IC chips having different IC packages. In some embodiments, transmitter 110 and receiver 120 are in different IC chips within a common IC package. In some embodiments, transmitter 110 and receiver 120 are in different electrical devices of a common IC chip.

Transmitter 110 is coupled to N input data lines IN[1], IN[2], and IN[N], where N is a positive integer equal to or greater than 1. Each data line of input data lines IN[1], IN[2], and IN[N] is configured to carry input data in the form of data signals DI[1], DI[2], or DI[N]. Transmitter 110 is configured to receive input data in the form of data signals DI[1], DI[2], or DI[N] via input data lines IN[1], IN[2], and IN[N], modulate the input data in the form of data signals DI[1], DI[2], or DI[N] based on a different carrier signal CK[1], CK[2], and CK[N] for each of the input data lines IN[1], IN[2], and IN[N], and transmit the modulated data in the form of a modulated data signal to receiver 120.

Transmitter 110 includes a carrier generator 112, N modulators M[1], M[2], and M[N], and a driver amplifier 114. Carrier generator 112 is connected with driver amplifier 114 via the N modulators M[1], M[2], and M[N].

Carrier generator 112 is configured to generate N carrier signals CK[1], CK[2], and CK[N] on corresponding carrier lines TXC[1], TXC[2], and TXC[N]. Each carrier signal of the carrier signals CK[1], CK[2], and CK[N] is a continuous wave signal having a different fundamental frequency.

Each modulator of modulators M[1], M[2], and M[N] has a clock input terminal coupled with a corresponding carrier line of carrier lines TXC[1], TXC[2], and TXC[N] and a data terminal coupled with a corresponding data line of input data lines IN[1], IN[2], and IN[N]. Each modulator of modulators M[1], M[2], and M[N] is configured to output modulated data to driver amplifier 114 in a form of a pair of differential signals.

Driver amplifier 114 is configured to generate an amplified modulated signal to be transmitted on transmission line 130 based on various modulated input data from modulators M[1], M[2], and M[N]. In some embodiments, a summing block (not shown) is connected between the modulators M[1], M[2], and M[N] and driver amplifier 114. In some embodiments, a multiplexer (not shown) is connected between the modulators M[1], M[2], and M[N] and driver amplifier 114.

Transmission line 130 includes two conductive lines suitable to transmit a signal in a differential mode. The modulated signal transmitted on transmission line 130 is also in a form of a pair of differential signals $D_P$ and $D_N$ at the output terminals of driver amplifier 114. In some embodiments, driver amplifier 114 is a low noise amplifier (LNA).

Receiver 120 is coupled to transmission line 130, and N output data lines OUT[1], OUT[2], and OUT[N]. Each data line of output data lines OUT[1], OUT[2], and OUT[N] is configured to carry demodulated data in the form of a demodulated data signal DO[1], DO[2], or DO[N]. Receiver 120 includes a carrier generator 122, N demodulators DM[1], DM[2], and DM[N], and a receiver amplifier 124.

Carrier generator 122 is configured to generate N carrier signals CK[1]', CK[2]', and CK[N]'. Each carrier signal of carrier signals CK[1]', CK[2]', and CK[N]' and a corresponding carrier signal of carrier signals CK[1], CK[2], and CK[N] have the same carrier clock frequency, or a difference thereof is within a predetermined engineering tolerance.

A phase error between carrier signals CK[1]', CK[2]', and CK[N]' and the amplified modulated signal from receiver amplifier 124 is preemptively compensated for by carrier generator 122. In some embodiments, carrier generator 112 and carrier generator 122 are coupled through channel 150 to exchange control information, sample carrier signals, or other carrier-related information. In some embodiments, channel 150 is a physical channel that includes one or more conductive lines. In some embodiments, channel 150 is a logical channel, and the actual electrical signals are exchanged through transmission line 130.

Receiver amplifier 124 is configured to receive an amplified modulated signal transmitted on transmission line 130. The amplified modulated signal received by receiver amplifier 124 from transmission line 130 is also in a form of a pair of differential signals $D_P'$ and $D_N'$ at the input terminals of receiver amplifier 124. Compared with the pair of differential signals $D_P$ and $D_N$, the pair of differential signals $D_P'$ and $D_N'$ have a delay and a channel distortion caused by transmission line 130. In some embodiments, receiver amplifier 124 is an LNA. Receiver amplifier 124 is also configured to output amplified modulated signal to demodulators DM[1], DM[2], and DM[N]. In some embodiments, a summing block (not shown) is connected between the demodulators DM[1], DM[2], and DM[N] and receiver amplifier 124. In some embodiments, a multiplexer (not shown) is connected between the demodulators DM[1], DM[2], and DM[N] and receiver amplifier 124.

Demodulators DM[1], DM[2], and DM[N] are coupled to receiver amplifier 124 to receive the amplified modulated signal and are coupled to carrier generator 122 through corresponding carrier lines RXC[1], RXC[2], and RXC[N]. Each demodulator of demodulators DM[1], DM[2], and DM[N] outputs a demodulated data signal DO[1], DO[2], and DO[N] based on the amplified modulated signal from receiver amplifier 124 and carrier signals CK[1]', CK[2]', and CK[N]' on corresponding carrier lines RXC[1], RXC[2], and RXC[N]. Each demodulator of demodulators DM[1], DM[2], and DM[N] is coupled to a corresponding data line of output data lines OUT[1], OUT[2], and OUT[N].

In some embodiments, each modulator of modulators M[1], M[2], and M[N] modulates the input data based on a Quadrature Amplitude Modulation (QAM) scheme having a predetermined number of constellation points. In some embodiments, the predetermined number of constellation points ranges from 64 to 1026. Demodulators DM[1], DM[2], and DM[N] are configured to match the modulation scheme of the corresponding modulators M[1], M[2], and M[N]. In some embodiments, modulators M[1], M[2], and M[N] and corresponding demodulators DM[1], DM[2], and DM[N] are configured based on a Phase Shift Keying (PSK) scheme or other suitable modulation schemes. In some embodiments, modulators M[1], M[2], and M[N] and corresponding demodulators DM[1], DM[2], and DM[N] are implemented to have two or more different modulation schemes or settings.

Demodulators DM[1], DM[2], and DM[N] include mixers $MIX_1$, $MIX_2$, and $MIX_N$ and filters $Filter_1$, $Filter_2$, and $Filter_N$. Each demodulator of demodulators DM[1], DM[2], and DM[N] includes a corresponding mixer Mai, $MIX_2$, and $MIX_N$ and a corresponding filter $Filter_1$, $Filter_2$, and $Filter_N$.

Mixers $MIX_1$, $MIX_2$, and $MIX_N$ are coupled to receiver amplifier 124 to receive the amplified modulated signal and are coupled to carrier generator 122 through corresponding carrier lines RXC[1], RXC[2], and RXC[N]. Each mixer of mixers $MIX_1$, $MIX_2$, and $MIX_N$ outputs a mixed data signal MO[1], MO[2], and MO[N] based on the amplified modulated signal from receiver amplifier 124 and carrier signals CK[1]', CK[2]', and CK[N]' on corresponding carrier lines RXC[1], RXC[2], and RXC[N]. In some embodiments, one or more mixed data signals of the mixed data signal MO[1], MO[2], and MO[N] corresponds to an intermediate frequency (IF) signal.

Filters $Filter_1$, $Filter_2$, and $Filter_N$ are coupled to Mixers $MIX_1$, $MIX_2$, and $MIX_N$ to receive the mixed data signals MO[1], MO[2], and MO[N]. Each filter of filters $Filter_1$, $Filter_2$, and $Filter_N$ outputs a corresponding demodulated data signal DO[1], DO[2], and DO[N]. Each demodulated data signal of the demodulated data signal DO[1], DO[2], and DO[N] corresponds to a filtered version of the mixed data signal MO[1], MO[2], and MO[N].

Each filter of filters $Filter_1$, $Filter_2$, and $Filter_N$ is coupled to a corresponding data line of output data lines OUT[1], OUT[2], and OUT[N]. In some embodiments, one or more filters of the filters $Filter_1$, $Filter_2$, and $Filter_N$ corresponds to a band pass filter. In some embodiments, one or more filters of the filters $Filter_1$, $Filter_2$, and $Filter_N$ correspond to a low pass filter.

Figure 2:
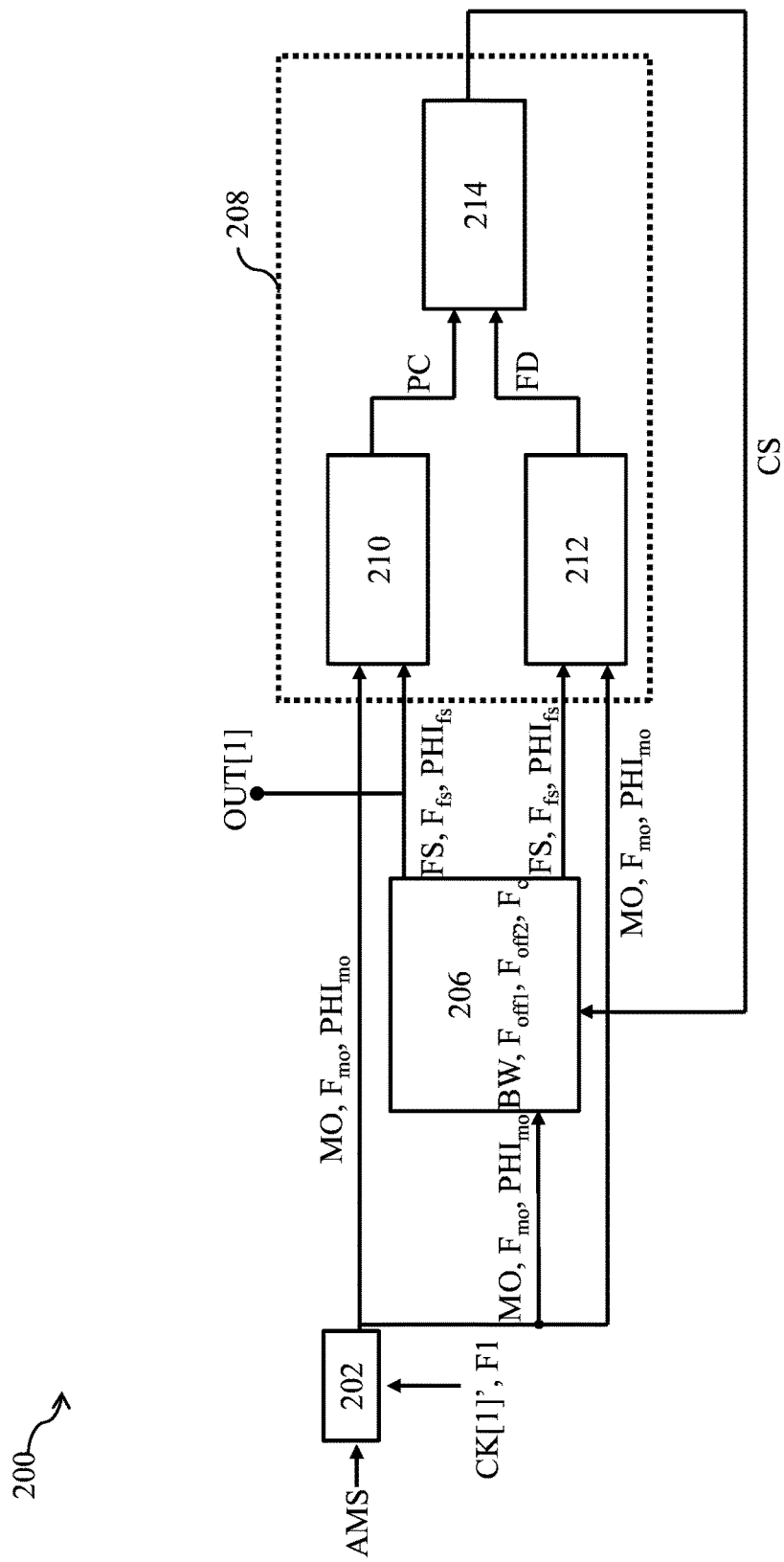
FIG. 2 is a block diagram of a demodulator usable as a demodulator in FIG. 1, in accordance with some embodiments.

FIG. 2 is a block diagram of a demodulator 200 usable as a demodulator DM (FIG. 1) in the data communication system 100, in accordance with some embodiments. Demodulator 200 includes a mixer 202, a filter 206, and a bandwidth adjusting circuit 208.

Mixer 202 is usable as a mixer $MIX_1$ (FIG. 1). Filter 206 is usable as a filter $Filter_1$ (FIG. 1). Mixed data signal MO is an embodiment of mixed data signal MO[1] (FIG. 1).

Demodulator 200 is configured to demodulate an amplified modulated signal AMS based on carrier signal CK[1]'. Carrier signal CK[1]' has a first carrier frequency F1.

Mixer 202 is connected to filter 206 and bandwidth adjusting circuit 208. Mixer 202 is configured to receive carrier signal CK[1]' and amplified modulated signal AMS. Mixer 202 is configured to generate a mixed data signal MO based on the product of carrier signal CK[1]' and amplified modulated signal AMS. Mixed data signal MO has a plurality of frequencies including frequency $F_{mo}$ and a phase $PHI_{mo}$.

Filter 206 is connected to mixer 202 and bandwidth adjusting circuit 208. Filter 206 is configured to receive mixed data signal MO and a set of control signals CS. Filter 206 is configured to filter the mixed data signal MO. Filter 206 is configured to output a filtered mixed data signal FS based on the mixed data signal MO. Filtered mixed data signal FS has a frequency $F_{fs}$ and a phase $PHI_{fs}$. In some embodiments, the frequency $F_{fs}$ of filtered mixed data signal FS is a fundamental frequency. In some embodiments, filtered mixed data signal FS includes a plurality of frequencies and the frequency $F_{fs}$ is a portion of the plurality of the frequencies.

Filter 206 is configured to have a first cutoff frequency $F_{off1}$ and a bandwidth BW. In some embodiments, frequency $F_{fs}$ of the filtered mixed data signal FS is less than a first cutoff frequency $F_{off1}$. The bandwidth BW of filter 206 is controlled by the set of control signals CS. In some embodiments, the first cutoff frequency $F_{off1}$ of the filter is adjusted based on the set of control signals CS.

In some embodiments, filter 206 is a low pass filter having a center frequency $F_C$ equal to 0 hertz (Hz). In some embodiments, the first cutoff frequency $F_{off1}$ defines the bandwidth BW of the low pass filter. In some embodiments, the bandwidth BW of the low pass filter or the first cutoff frequency $F_{off1}$ of the low pass filter is adjusted based on the set of control signals CS.

In some embodiments, filter 206 is a band pass filter having a center frequency $F_C$, first cutoff frequency $F_{off1}$, and a second cutoff frequency $F_{off2}$. In some embodiments, first cutoff frequency $F_{off1}$ and second cutoff frequency $F_{off2}$ of the band pass filter define the bandwidth BW. In some embodiments, first cutoff frequency $F_{off1}$ or second cutoff frequency $F_{off2}$ of the band pass filter is adjusted based on the set of control signals CS. In some embodiments, first cutoff frequency $F_{off1}$ is greater than second cutoff frequency $F_{off2}$. In some embodiments, the bandwidth BW of the band pass filter is adjusted by adjusting the first cutoff frequency $F_{off1}$ or the second cutoff frequency $F_{off2}$. In some embodiments, the center frequency $F_C$ of the band pass filter is less than the first cutoff frequency $F_{off1}$, and the center frequency $F_C$ of the band pass filter is greater than a second cutoff frequency $F_{off2}$ of the band pass filter. In some embodiments, the frequency $F_{fs}$ of filtered mixed data signal FS is greater than the second cutoff frequency $F_{off2}$.

In some embodiments, filter 206 is a Butterworth filter of any order, a Chebyshev Type 1 filter of any order or a Chebyshev Type 2 filter of any order. In some embodiments, filter 206 is an elliptic filter, a Bessel-Thomson filter or a Gaussian filter.

Bandwidth adjusting circuit 208 is connected to mixer 202 and filter 206. Bandwidth adjusting circuit 208 is configured to adjust the bandwidth BW of filter 206 based on the frequency $F_{fs}$ of filtered mixed data signal FS and the frequency $F_{mo}$ of mixed data signal MO, or the phase $PHI_{fs}$ of filtered mixed data signal FS and the phase $PHI_{mo}$ of mixed data signal MO. Bandwidth adjusting circuit 208 is configured to generate the set of control signals CS. The set of control signals CS includes one or more control signals. Each control signal includes one or more bits. Bandwidth adjusting circuit 208 includes a phase comparator 210, a frequency detector 212 and a controller 214.

Phase comparator 210 is connected to mixer 202, filter 206, controller 214 and output data line OUT[1].

Phase comparator 210 is configured to receive the phase $PHI_{fs}$ of filtered mixed data signal FS and the phase $PHI_{mo}$ of mixed data signal MO. Phase comparator 210 is configured to detect a phase relationship between the phase $PHI_{fs}$ of filtered mixed data signal FS and the phase $PHI_{mo}$ of mixed data signal MO.

Phase comparator 210 is configured to output a signal PC to the controller 214. In some embodiments, signal PC corresponds to the phase relationship between the phase $PHI_{fs}$ of filtered mixed data signal FS and the phase $PHI_{mo}$ of mixed data signal MO. In some embodiments, the phase relationship between the phase $PHI_{fs}$ of filtered mixed data signal FS and the phase $PHI_{mo}$ of mixed data signal MO corresponds to the difference between the phase $PHI_{fs}$ of filtered mixed data signal FS and the phase $PHI_{mo}$ of mixed data signal MO. In some embodiments, the difference between the phase $PHI_{fs}$ of filtered mixed data signal FS and the phase $PHI_{mo}$ of mixed data signal MO is greater than or equal to 90 degrees. Signal PC corresponds to a digital signal with a binary value.

Frequency detector 212 is connected to mixer 202, filter 206 and controller 214. Frequency detector 212 is configured to detect a frequency relationship between the frequency $F_{fs}$ of filtered mixed data signal FS and the frequency $F_{mo}$ of mixed data signal MO. Frequency detector 212 is configured to output a signal FD based on the frequency relationship.

In some embodiments, the frequency relationship between the frequency $F_{fs}$ of filtered mixed data signal FS and the frequency $F_{mo}$ of mixed data signal MO corresponds to whether the frequency $F_{fs}$ of filtered mixed data signal FS is equal to the frequency $F_{mo}$ of mixed data signal MO. In some embodiments, the frequency relationship between the frequency $F_{fs}$ of filtered mixed data signal FS and the frequency $F_{mo}$ of mixed data signal MO corresponds to the difference between the frequency $F_{fs}$ of filtered mixed data signal FS and the frequency $F_{mo}$ of mixed data signal MO. Signal FD corresponds to a digital signal with a binary value.

Controller 214 is connected to filter 206, phase comparator 210 and frequency detector 212. Controller 214 is configured to receive signal PC from phase comparator 210 and signal FD from frequency detector 212. Controller 214 is configured to generate the set of control signals CS. Controller 214 is configured to output the set of control signals CS to filter 206. In some embodiments, controller 214 is configured to generate the set of control signals CS based on the difference between the phase $PHI_{fs}$ of filtered mixed data signal FS and the phase $PHI_{mo}$ of mixed data signal MO. In some embodiments, controller 214 is configured to generate the set of control signals CS based on the frequency relationship between the frequency $F_{fs}$ of filtered mixed data signal FS and the frequency $F_{mo}$ of mixed data signal MO.

The set of control signals CS is stored in memory 704 (shown in FIG. 7) in controller 214. In some embodiments, each set of control signals CS has a corresponding configuration of the bandwidth adjusting circuit 208. In some embodiments, controller 214 is a finite state machine. In some embodiments, controller 214 corresponds to a programmable logic device, a programmable logic controller, one or more logic gates, one or more flip-flops or one or more relay devices.

Figure 3A:
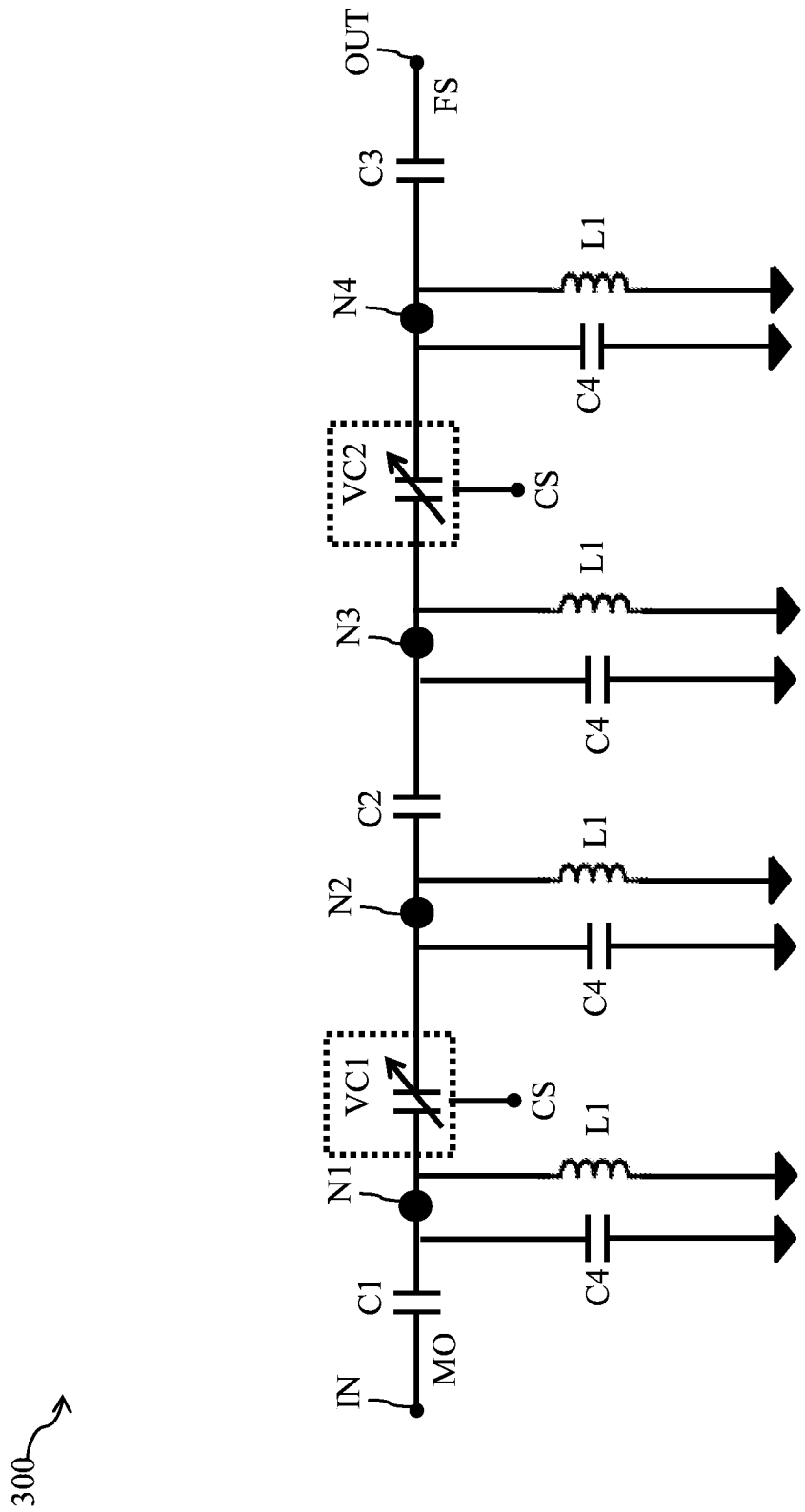
FIG. 3A is a circuit diagram of a filter usable in the demodulator in FIG. 2, in accordance with some embodiments.

FIG. 3A is a circuit diagram of a filter 300 usable as demodulator 200 (FIG. 2), in accordance with some embodiments. Filter 300 is usable as filter Filter$_1$ (FIG. 1). Filter 300 is usable as filter 206 (FIG. 2).

Filter 300 includes a first capacitor C1 connected in series with a first variable capacitor VC1, a second capacitor C2, a second variable capacitor VC2, and a third capacitor C3. Filter 300 further includes a plurality of inductors L1 and a plurality of capacitors C4. Each inductor of the plurality of inductors L1 is arranged in parallel with a corresponding capacitor of the plurality of capacitors C4. Filter 300 also includes an input port IN connected at one side of first capacitor C1 opposite first variable capacitor VC1. Filter 300 also includes an output port OUT connected at one side of third capacitor C3 opposite second variable capacitor VC2.

An inductor of the plurality of inductors L1 and a corresponding capacitor of the plurality of capacitors C4 are connected between a ground terminal and a first node N1. First node N1 connects capacitor C1 and first variable capacitor VC1. First variable capacitor VC1 is configured to receive the set of control signals CS.

An inductor of the plurality of inductors L1 and a corresponding capacitor of the plurality of capacitors C4 are connected between the ground terminal and a second node N2. Second node N2 connects first variable capacitor VC1 and capacitor C2.

An inductor of the plurality of inductors L1 and a corresponding capacitor of the plurality of capacitors C4 are connected between the ground terminal and a third node N3. Third node N3 connects second capacitor C2 and second variable capacitor VC2. Second variable capacitor VC2 is configured to receive the set of control signals CS.

An inductor of the plurality of inductors L1 and a corresponding capacitor of the plurality of capacitors C4 are connected between the ground terminal and a fourth node N4. Fourth node N4 connects second variable capacitor VC2 and third capacitor C3.

Filter 300 is configured to receive mixed data signal MO on input port IN and a set of control signals CS. Filter 300 is configured to output filtered mixed data signal FS on output port OUT based on the set of control signals CS.

The output response of filter 300 is adjusted based on adjustment of the value of the first variable capacitor VC1 or the second variable capacitor VC2. The values of the first variable capacitor VC1 or the second variable capacitor VC2 are adjusted by the set of control signal CS. By adjusting the values of the first variable capacitor VC1 or the second variable capacitor VC2, the first cutoff frequency, the center frequency, the second cutoff frequency or the bandwidth of filter 300 are adjusted.

In some embodiments, filter 300 includes a greater or lesser number of variable capacitors (e.g., first variable capacitor VC1 or the second variable capacitor VC2) other than that shown in FIG. 3. In some embodiments, first variable capacitor VC1 or second variable capacitor VC2 corresponds to a metal oxide semiconductor capacitor (MOSCAP). In some embodiments, first variable capacitor VC1 or second variable capacitor VC2 corresponds to an adjustable capacitor array configured to set an equivalent capacitance value based on the set of control signals CS.

In some embodiments, at least one of a value of first capacitor C1, a value of second capacitor C2, a value of third capacitor C3 or a value of fourth capacitor C4 is equal to at least one of the value of first capacitor C1, the value of second capacitor C2, the value of third capacitor C3 or the value of fourth capacitor C4. In some embodiments, at least one of a value of first capacitor C1, a value of second capacitor C2, a value of third capacitor C3 or a value of fourth capacitor C4 is different from at least one of the value of first capacitor C1, the value of second capacitor C2, the value of third capacitor C3 or the value of fourth capacitor C4 In some embodiments, a value of first variable capacitor VC1 is equal to a value of second variable capacitor VC2. In some embodiments, the value of first variable capacitor VC1 is different from the value of second variable capacitor VC2.

Figure 3B:
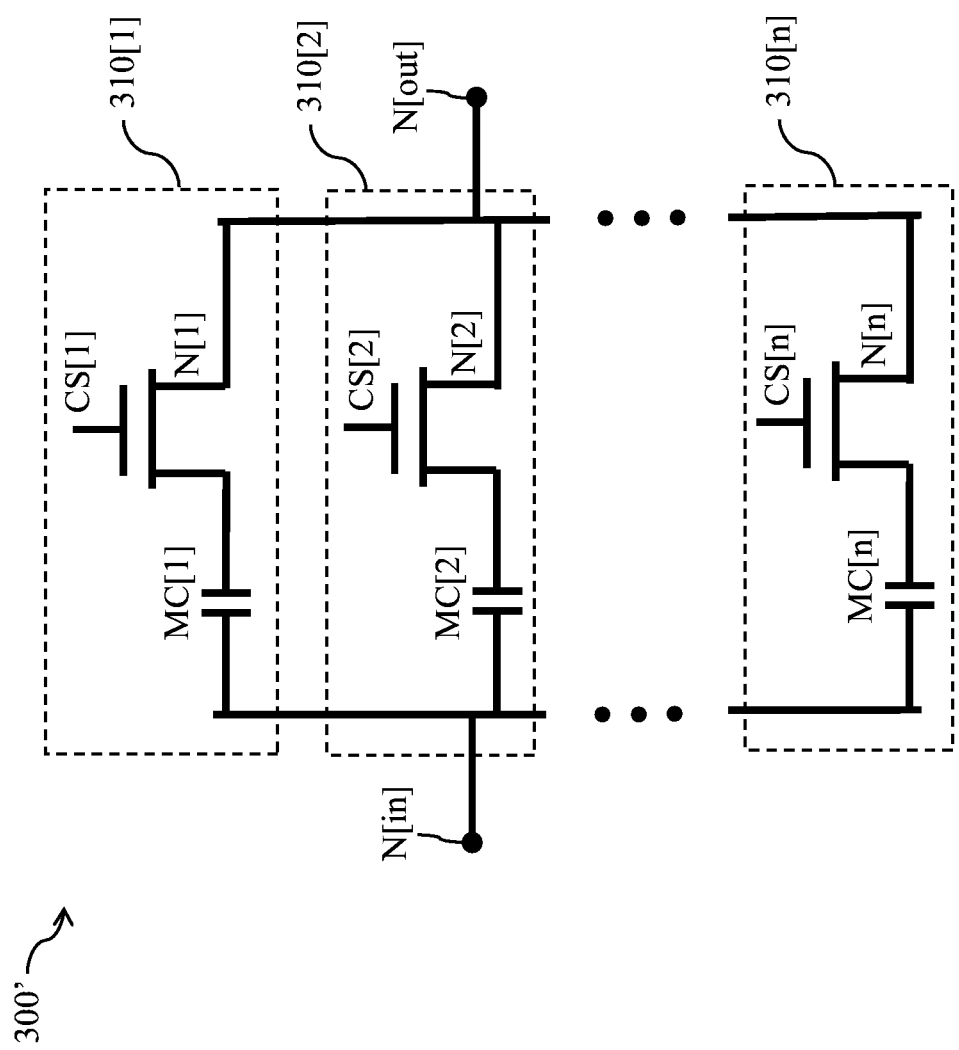
FIG. 3B is a circuit diagram of a variable capacitor usable in the filter in FIG. 3A, in accordance with some embodiments.

FIG. 3B is a circuit diagram of a variable capacitor 300' usable in the filter in FIG. 3A, in accordance with some embodiments. Variable capacitor 300' is usable as either or both of first variable capacitor VC1 or second variable capacitor VC2 (FIG. 3A).

Input node N[in] is an embodiment of first node N1 or third node N3 (FIG. 3A). Output node N[out] is an embodiment of second node N2 or fourth node N4 (FIG. 3A). Set of control signals CS[1], CS[2], or CS[n] is an embodiment of set of control signals CS (FIGS. 2 & 3A).

Variable capacitor 300' includes N branches 310[1], 310[2], and 310[n], where n is a positive integer equal to or greater than 1. Variable capacitor 300' further includes an input node N[in] and an output node N[out]. Input node N[in] is connected at one side of N branches 310[1], 310[2], and 310[n] opposite of the output node N[out]. Output node N[out] is connected at one side of N branches 310[1], 310[2], and 310[n] opposite of the input node N[in].

Each branch of branches 310[1], 310[2], and 310[n] is configured to receive a corresponding control signal in the form of a set of control signals CS[1], CS[2], or CS[n]. Each branch of branches 310[1], 310[2], and 310[n] is configured to couple input node N[in] to output node N[out]. Each branch of branches 310[1], 310[2], and 310[n] is arranged in parallel with each other.

Branches 310[1], 310[2], and 310[n] include capacitors MC[1], MC[2], and MC[n] and transistors N[1], N[2], and N[n]. Each branch of branches 310[1], 310[2], and 310[n] includes a corresponding capacitor MC[1], MC[2], and MC[n] and a corresponding transistor N[1], N[2], and N[n].

Capacitors MC[1], MC[2], and MC[n] are coupled to input node N[in] and transistors N[1], N[2], and N[n]. A first terminal of each capacitor of capacitors MC[1], MC[2], and MC[n] is coupled to input node N[in]. A second terminal of each capacitor of capacitors MC[1], MC[2], and MC[n] is coupled to a corresponding transistor of transistors N[1], N[2], and N[n]. Each capacitor of capacitors MC[1], MC[2], and MC[n] is coupled in series with a corresponding transistor of transistors N[1], N[2], and N[n]. In some embodiments, at least one value of a capacitor of capacitors MC[1], MC[2], or MC[n] is equal to at least one value of a capacitor of capacitors MC[1], MC[2], or MC[n]. In some embodiments, at least one value of a capacitor of capacitors MC[1], MC[2], or MC[n] is different than at least one value of a capacitor of capacitors MC[1], MC[2], or MC[n].

Transistors N[1], N[2], and N[n] are coupled to output node N[out] and capacitors MC[1], MC[2], and MC[n]. A source terminal of each transistor of transistors N[1], N[2], and N[n] is coupled to a second terminal of each corresponding capacitor of capacitors MC[1], MC[2], and MC[n]. A drain terminal of each transistor of transistors N[1], N[2], and N[n] is coupled to output node N[out]. A gate terminal of each transistor of transistors N[1], N[2], and N[n] is configured to receive a corresponding control signal in the form of a set of control signals CS[1], CS[2], or CS[n]. Each control signal of the set of control signals CS[1], CS[2], or CS[n] is a logically low signal or a logically high signal. Each transistor of transistors N[1], N[2], and N[n] is configured to be turned on or off responsive to a corresponding control signal in the form of a set of control signals CS[1], CS[2], or CS[n].

As a number of transistors of transistors N[1], N[2], and N[n] turned on is increased, a number of capacitors of capacitors MC[1], MC[2], and MC[n] in parallel with each other is increased. As the number of capacitors of capacitors MC[1], MC[2], and MC[n] arranged in parallel with each other is increased, the equivalent capacitance of variable capacitor 300' is increased. As the number of transistors of transistors N[1], N[2], and N[n] turned on is decreased, a number of capacitors of capacitors MC[1], MC[2], and MC[n] in parallel with each other is decreased. As the number of capacitors of capacitors MC[1], MC[2], and MC[n] arranged in parallel with each other is decreased, the equivalent capacitance of variable capacitor 300' is decreased.

In some embodiments, an n-type or a p-type MOS field effect transistor (FET) is usable in one or more transistors of transistors N[1], N[2], and N[n]. In some embodiments, at least one transistor of transistors N[1], N[2], or N[n] has a transistor type that is the same as at least one transistor of transistors N[1], N[2], or N[n]. In some embodiments, at least one transistor of transistors N[1], N[2], or N[n] has a transistor type that is different than at least one transistor of transistors N[1], N[2], or N[n].

Figure 4A:
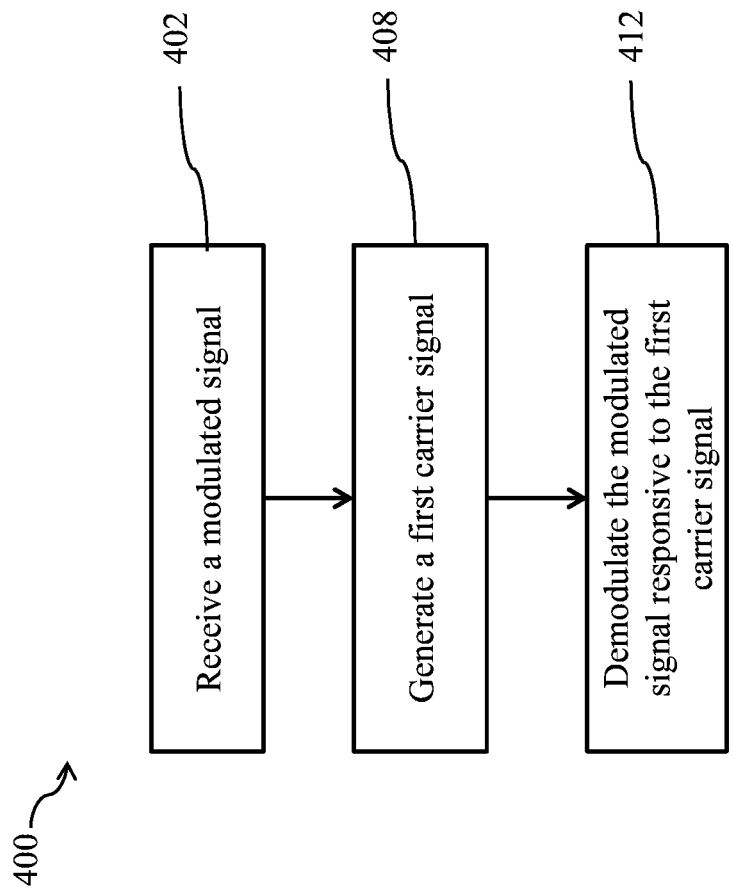
FIG. 4A is a flowchart of a method of data communications from a receiver perspective, in accordance with some embodiments.

FIG. 4A is a flowchart of a method 400 of data communication from a receiver perspective, in accordance with some embodiments. It is understood that additional operations may be performed before, during, and/or after the method 400 depicted in FIG. 4A, and that some other processes may only be briefly described herein.

Method 400 begins with operation 402, where a modulated signal is received through a first transmission line (e.g., first transmission line 130 (FIG. 1)). In this embodiment, the modulated signal is in a form of a pair of differential signals DP' and DN'.

Method 400 continues with operation 408, where a first carrier signal (e.g., first carrier signal CK[1]' (FIG. 1)) is generated (e.g., generated by carrier generator 122 (FIG. 1)). In embodiments in which receiver 120 includes more than one demodulator DM[1] (i.e., N>1), operation 408 is repeated to generate all corresponding carrier signals CK[1]', CK[2]', and CK[N]'.

Method 400 continues with operation 412, where the modulated signal is demodulated responsive to the first carrier signal (e.g., first carrier signal CK[1]' (FIG. 1)), thereby generating a first demodulated data stream (e.g., demodulated data stream DO[1] (FIG. 1)). In embodiments in which receiver 120 includes more than one demodulator DM[1] (i.e., N>1), operation 412 is repeated to generate all corresponding demodulated data streams DO[1], DO[2], and DO[N].

Figure 4B:
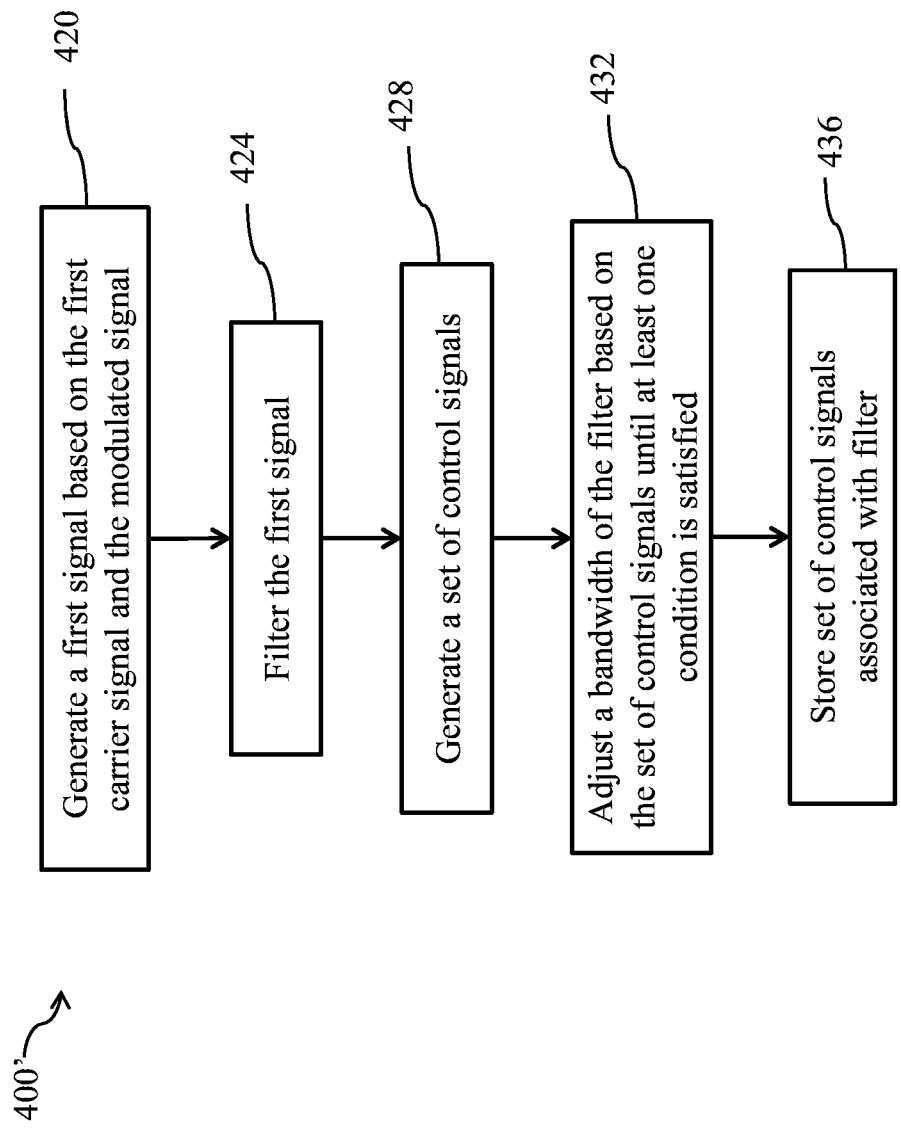
FIG. 4B is a flowchart of a method of demodulating a modulated signal, in accordance with some embodiments.

FIG. 4B is a flowchart of a method 400' of demodulating a modulated signal, in accordance with some embodiments. It is understood that additional operations may be performed before, during, and/or after the method 400' depicted in FIG. 4B, and that some other processes may only be briefly described herein. In embodiments in which receiver 120 includes more than one demodulator DM[1] (i.e., N>1), method 400' is repeated for each corresponding demodulator DM[1], DM[2], DM[N].

Method 400' begins with operation 420 during which a first signal (e.g., mixed data signal MO (FIG. 2)) is generated based on the first carrier signal (e.g., first carrier signal CK[1]' (FIG. 1)) and the modulated signal (e.g., amplified modulated signal AMS).

In this embodiment, the modulated signal is in a form of a pair of differential signals DP' and DN'. In this embodiment, the first signal (e.g., mixed data signal MO (FIG. 2)) is generated by a mixer (e.g., mixer 202 (FIG. 2)).

Method 400' continues with operation 424, where the first signal (e.g., mixed data signal MO (FIG. 2)) is filtered by a filter (e.g., filter 206 (FIG. 2)). The filtered first signal (e.g., filtered mixed data signal FS (FIG. 2)) having a frequency (e.g., frequency $F_{fs}$ (FIG. 2)) less than a first cutoff frequency (e.g., first cutoff frequency $F_{off1}$ (FIG. 2)) of a filter.

Method 400' continues with operation 428, where a set of control signals (e.g., set of control signals CS (FIG. 2)) are generated based on a frequency (e.g., frequency $F_{fs}$ (FIG. 2)) of the filtered first signal (e.g., filtered mixed data signal FS (FIG. 2)) and a frequency (e.g., frequency $F_{mo}$ (FIG. 2)) of the first signal (e.g., mixed data signal MO), or a phase (e.g., phase $PHI_{fs}$ (FIG. 2)) of the filtered first signal (e.g., filtered mixed data signal FS (FIG. 2)) and a phase (e.g., phase $PHI_{mo}$ (FIG. 2)) of the first signal (e.g., mixed data signal MO (FIG. 2)).

Method 400' continues with operation 432, where a bandwidth (e.g., bandwidth BW (FIG. 2)) of the filter (e.g., filter 200 (FIG. 2)) is adjusted based on the set of control signals (e.g., set of control signals CS (FIG. 2)) until at least one condition is satisfied.

In some embodiments, the at least one condition is satisfied when the phase difference between the phase (e.g., phase $PHI_{fs}$ (FIG. 2)) of the filtered first signal (e.g., filtered mixed data signal FS (FIG. 2)) and a phase (e.g., phase $PHI_{mo}$ (FIG. 2)) of the first signal (e.g., mixed data signal MO (FIG. 2)) is greater than or equal to 90 degrees.

In some embodiments, the at least one condition is satisfied when the frequency (e.g., frequency $F_{fs}$ (FIG. 2)) of the filtered first signal (e.g., filtered mixed data signal FS (FIG. 2)) is equal to the frequency (e.g., frequency $F_{mo}$ (FIG. 2)) of the first signal (e.g., mixed data signal MO (FIG. 2)).

Figure 7:
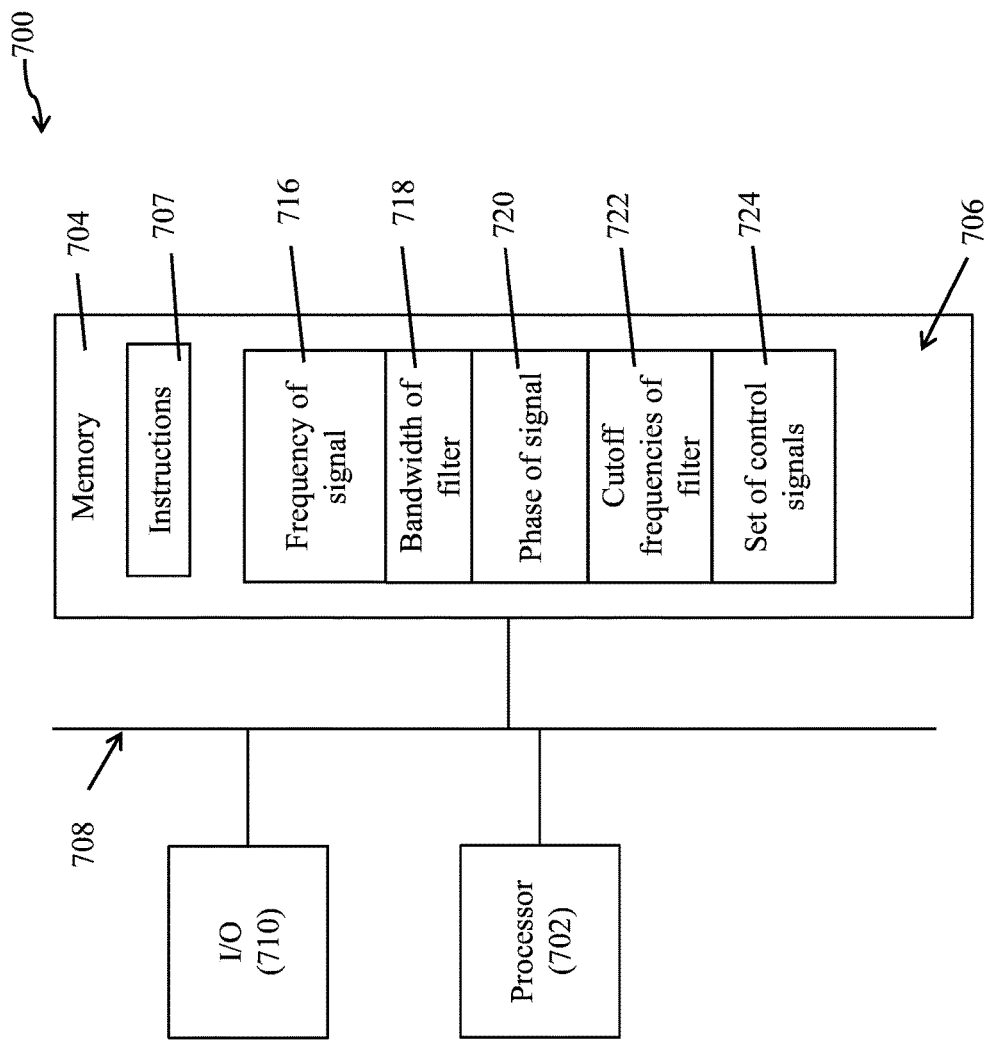
FIG. 7 is a block diagram of a controller usable in the bandwidth adjusting circuit in FIG. 2, in accordance with some embodiments.

Method 400' continues with operation 436, where a set of control signals (e.g., set of control signals CS (FIG. 2)) associated with the filter (e.g., filter 200) are stored in memory (e.g., memory 704 shown in FIG. 7).

Figure 5:
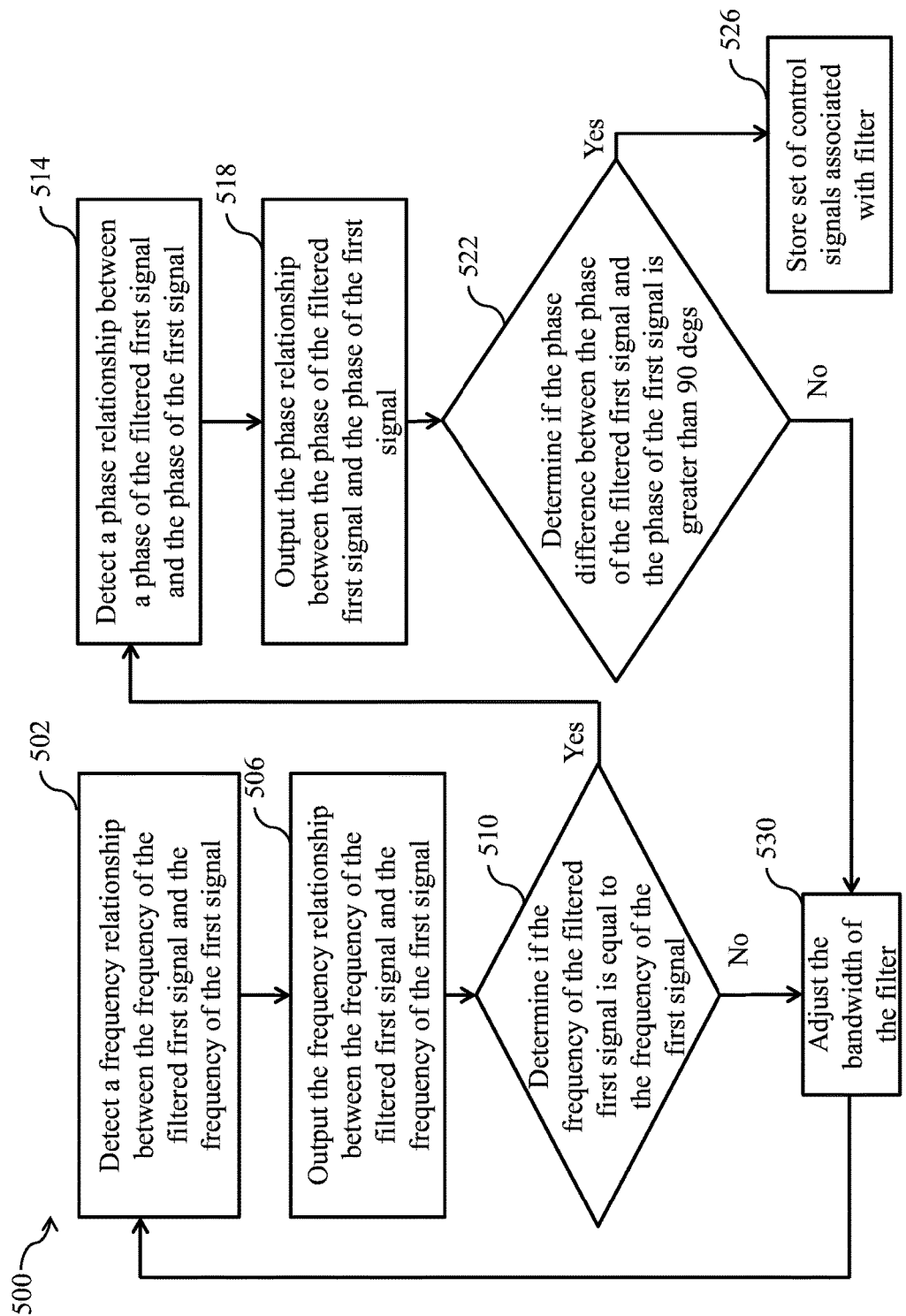
FIG. 5 is a flowchart of a method of adjusting a bandwidth of the filter in FIG. 3A, in accordance with some embodiments.

FIG. 5 is a flowchart of a method 500 of adjusting a bandwidth of the filter in FIG. 3A, in accordance with some embodiments. It is understood that additional operations may be performed before, during, and/or after the method 500 depicted in FIG. 5, and that some other processes may only be briefly described herein. In embodiments in which receiver 120 includes more than one demodulator DM[1] (i.e., N>1), method 500 is repeated for each corresponding demodulator DM[1], DM[2], DM[N].

Method 500 begins with operation 502, where a frequency relationship is detected between a frequency (e.g., frequency $F_{fs}$ (FIG. 2)) of the filtered first signal (e.g., filtered mixed data signal FS) and a frequency (e.g., frequency $F_{mo}$) of the first signal (e.g., mixed data signal MO). In some embodiments, the frequency relationship of operation 512 is detected by a frequency detector (e.g., frequency detector 212 (FIG. 2)).

Method 500 continues with operation 506, where the frequency relationship between the frequency (e.g., frequency $F_{fs}$ (FIG. 2)) of the filtered first signal (e.g., filtered mixed data signal FS) and the frequency (e.g., frequency $F_{mo}$) of the first signal (e.g., mixed data signal MO) is output to a controller (e.g., controller 214).

In some embodiments, operation 506 also includes outputting a second signal (e.g., signal FD (FIG. 2)) based on the frequency relationship between the filtered first signal (e.g., filtered mixed data signal FS) and the first signal (e.g., mixed data signal MO). Second signal is a logically low signal or a logically high signal.

In some embodiments, the frequency relationship of operation 506 corresponds to the difference between the frequency (e.g., frequency $F_{fs}$ (FIG. 2)) of the filtered first signal (e.g., filtered mixed data signal FS) and the frequency (e.g., frequency $F_{mo}$) of the first signal (e.g., mixed data signal MO).

Method 500 continues with operation 510, where the bandwidth adjusting circuit 208 determines if the frequency (e.g., frequency $F_{fs}$ (FIG. 2)) of the filtered first signal (e.g., filtered mixed data signal FS) is equal to the frequency (e.g., frequency $F_{mo}$) of the first signal (e.g., mixed data signal MO).

If the bandwidth adjusting circuit 208 determines that the frequency (e.g., frequency $F_{fs}$ (FIG. 2)) of the filtered first signal (e.g., filtered mixed data signal FS) is equal to the frequency (e.g., frequency $F_{mo}$) of the first signal (e.g., mixed data signal MO), the operation proceeds to operation 514.

If the bandwidth adjusting circuit 208 determines that the frequency (e.g., frequency $F_{fs}$ (FIG. 2)) of the filtered first signal (e.g., filtered mixed data signal FS) is not equal to the frequency (e.g., frequency $F_{mo}$) of the first signal (e.g., mixed data signal MO), the operation proceeds to operation 530.

Method 500 continues with operation 514, where a phase relationship is detected between a phase (e.g., phase $PHI_{fs}$ (FIG. 2)) of the filtered first signal (e.g., filtered mixed data signal FS) and a phase (e.g., phase $PHI_{mo}$) of the first signal (e.g., mixed data signal MO). In some embodiments, the phase relationship of operation 514 is detected by a phase comparator (e.g., phase comparator 210 (FIG. 2)).

Method 500 continues with operation 518, where the phase relationship between the phase (e.g., phase $PHI_{fs}$ (FIG. 2)) of the filtered first signal (e.g., filtered mixed data signal FS) and the phase (e.g., phase $PHI_{mo}$) of the first signal (e.g., mixed data signal MO) is output to a controller (e.g., controller 214).

In some embodiments, the phase relationship of operation 518 corresponds to the difference between phase (e.g., phase $PHI_{fs}$ (FIG. 2)) of the filtered first signal (e.g., filtered mixed data signal FS) and the phase (e.g., phase $PHI_{mo}$) of the first signal (e.g., mixed data signal MO).

Method 500 continues with operation 522, where the bandwidth adjusting circuit 208 determines if the phase difference between phase (e.g., phase $PHI_{fs}$ (FIG. 2)) of the filtered first signal (e.g., filtered mixed data signal FS) and the phase (e.g., phase $PHI_{mo}$) of the first signal (e.g., mixed data signal MO) is greater than or equal to 90 degrees.

If the bandwidth adjusting circuit 208 determines that the phase difference between phase (e.g., phase $PHI_{fs}$ (FIG. 2)) of the filtered first signal (e.g., filtered mixed data signal FS) and the phase (e.g., phase $PHI_{mo}$) of the first signal (e.g., mixed data signal MO) is greater than or equal to 90 degrees, the operation proceeds to operation 526.

If the bandwidth adjusting circuit 208 determines that the phase difference between the phase (e.g., phase $PHI_{fs}$ (FIG. 2)) of the filtered first signal (e.g., filtered mixed data signal FS) and the phase (e.g., phase $PHI_{mo}$) of the first signal (e.g., mixed data signal MO) is less than 90 degrees, the operation proceeds to operation 530.

Method 500 continues with operation 526, where a set of control signals (e.g., set of control signals CS (FIG. 2)) associated with the filter (e.g., filter 200) are stored in memory (e.g., memory 704 shown in FIG. 7). Operation 526 is an embodiment of operation 436 of FIG. 4B with similar elements.

Method 500 continues with operation 530, where the bandwidth (e.g., bandwidth BW (FIG. 2)) of the filter (e.g., filter 206) is adjusted based on the set of control signals (e.g., set of control signals CS). Operation 530 is an embodiment of operation 432 of FIG. 4B with similar elements.

Figure 6A:
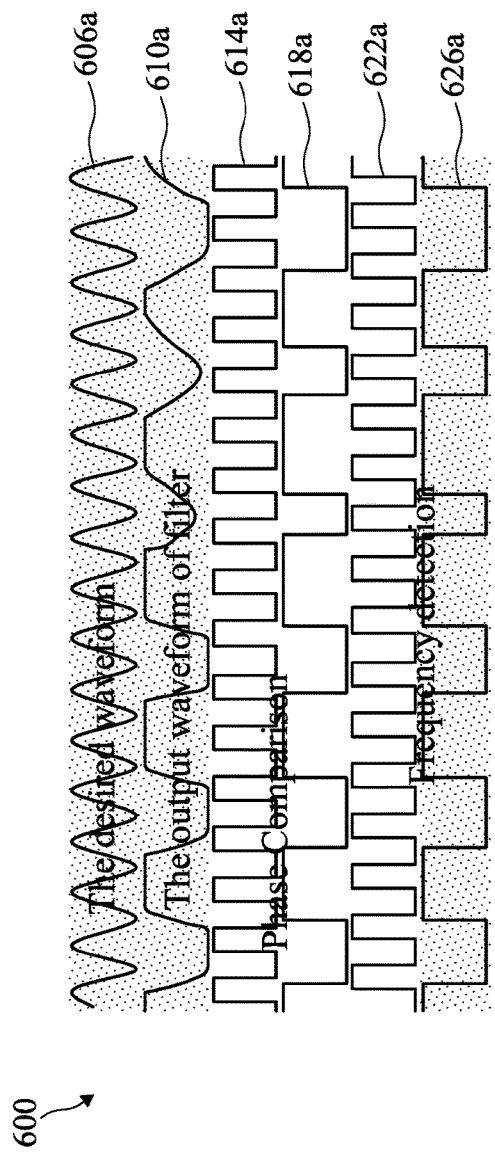
FIG. 6A is a timing diagram of a filtered waveform generated by a demodulator, in accordance with some embodiments.

FIG. 6A is a timing diagram 600 of a filtered waveform generated by a demodulator, in accordance with some embodiments.

Curve 606a represents a desired output signal of a first filter in a demodulator; curve 610a represents an output signal of the first filter; curve 614a represents a phase detected by a phase comparator of an unfiltered signal; curve 618a represents a phase detected by the phase comparator of a signal filtered by the first filter; curve 622a represents a frequency detected by a frequency detector of the unfiltered signal; and curve 626a represents a frequency detected by the frequency detector of a signal filtered by the first filter. In some embodiments, the first filter corresponds to an uncalibrated filter.

In some embodiments, the first filter corresponds to an uncalibrated embodiment of filters $Filter_1$, $Filter_2$ or $Filter_N$ (FIG. 1), filter 206 (FIG. 2) or filter 300 (FIG. 3).

As shown in FIG. 6A, when a signal is applied to the first filter, the first filter introduces distortion to the signal (as shown by curves 606a and 610a).

As shown in FIG. 6A, the first filter distorts the phase detected by the phase comparator (as shown by curves 614a and 618a).

As shown in FIG. 6A, the first filter distorts the frequency detected by the frequency detector (as shown by curves 622a and 626a).

In some embodiments, the distortion introduced by the first filter is attributed to PVT variations.

Figure 6B:
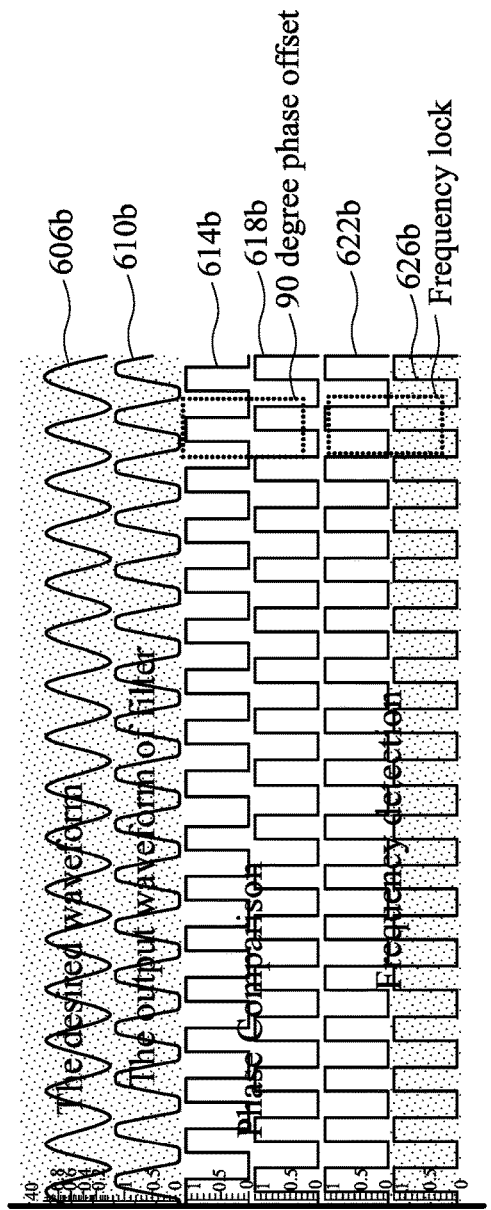
FIG. 6B is a timing diagram of a filtered waveform generated by the demodulator in FIG. 2, in accordance with some embodiments.

FIG. 6B is a timing diagram 600' of a filtered waveform generated by a demodulator, in accordance with some embodiments. The demodulator of FIG. 6B is an embodiment of demodulators DM[1], DM[2], and DM[N] (FIG. 1) or demodulator 200 (FIG. 2). The second filter is an embodiment of filters $Filter_1$, $Filter_2$ or $Filter_N$ (FIG. 1), filter 206 (FIG. 2) or filter 300 (FIG. 3). The second filter corresponds to an adjusted filter. In some embodiments, the second filter corresponds to a calibrated filter where the bandwidth of the filter has been adjusted.

Curve 606b represents a desired output signal of a second filter in a demodulator; curve 610b represents an output signal of the second filter; curve 614b represents a phase detected by a phase comparator of an unfiltered signal; curve 618b represents a phase detected by the phase comparator of a signal filtered by the second filter; curve 622b represents a frequency detected by a frequency detector of the unfiltered signal; and curve 626b represents a frequency detected by the frequency detector of a signal filtered by the second filter.

At time T1, curve 614b and 618b are out of phase by 90 degrees.

At time T1, the number of pulses between time T0 and T1 in curve 622b and 626b are equal.

As shown in FIGS. 6A & 6B, when a signal is applied to the first filter and the second filter, the second filter introduces less distortion to the signal (as shown by curves 606a, 606b, 610a and 610b) than the first filter.

As shown in FIGS. 6A & 6B, when a signal is applied to the first filter and the second filter, the second filter introduces less distortion to the phase detected by the phase comparator (as shown by curves 614a, 614b, 618a and 618b) than the first filter.

As shown in FIGS. 6A & 6B, when a signal is applied to the first filter and the second filter, the second filter introduces less distortion to the frequency detected by the frequency detector (as shown by curves 622a, 622b, 626a and 626b) than the first filter.

As shown in FIGS. 6A & 6B, the distortion attributed to PVT variations has been corrected by the implementation of demodulators DM[1], DM[2], and DM[N] (FIG. 1) or demodulator 200 (FIG. 2)

FIG. 7 is a block diagram of a controller 700 usable in the bandwidth adjusting circuit 208 in FIG. 2, in accordance with some embodiments. In some embodiments, the controller 700 is an embodiment of the controller 214 shown in bandwidth adjusting circuit 208 (FIG. 2). In some embodiments, the controller 700 is a computing device which implements at least a portion of method 400 of FIG. 4A, method 400' of FIG. 4B or method 500 of FIG. 5 in accordance with one or more embodiments. Controller 700 includes a hardware processor 702 and a non-transitory, computer readable storage medium 704 encoded with, i.e., storing, the computer program code 706, i.e., a set of executable instructions. Computer readable storage medium 704 is also encoded with instructions 707 for interfacing with bandwidth adjusting circuit 208 for adjusting the bandwidth of filter 206. The processor 702 is electrically coupled to the computer readable storage medium 704 via a bus 708. The processor 702 is also electrically coupled to an I/O interface 710 by bus 708. The processor 702 is configured to execute the computer program code 706 encoded in the computer readable storage medium 704 in order to cause controller 700 to be usable for performing a portion or all of the operations as described e.g., in method 400, 400' and 500.

In one or more embodiments, the processor 702 is a central processing unit (CPU), a multi-processor, a distributed processing system, an application specific integrated circuit (ASIC), and/or a suitable processing unit. The processor 702 is an embodiment of controller 214 (FIG. 2).

In one or more embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium 704 includes a compact disk-read only memory (CD-ROM), a compact disk-read/write (CD-R/W), and/or a digital video disc (DVD).

In one or more embodiments, the storage medium 704 stores the computer program code 706 configured to cause controller 700 to perform method 400, 500 or 500'. In one or more embodiments, the storage medium 704 also stores information needed for performing method 400, 500 or 500' as well as information generated during performing method 400, 500 or 500', such as frequency of signal 716, bandwidth of filter 718, phase of signal 720, cutoff frequencies of filter 722, set of control signals 724, and/or a set of executable instructions to perform the operation of method 400, 500 or 500'.

In some embodiments, frequency of signal 716 includes a frequency $F_{fs}$ of the filtered mixed data signal FS (FIG. 2) or a frequency $F_{mo}$ of the mixed data signal MO (FIG. 2). In some embodiments, bandwidth of filter 718 includes bandwidth BW of filter 206 (FIG. 2). In some embodiments, phase of signal 720 includes a phase $PHI_{fs}$ of the filtered mixed data signal FS (FIG. 2) or a phase $PHI_{mo}$ of the mixed data signal MO (FIG. 2). In some embodiments, cutoff frequencies of filter 722 include first cutoff frequency $F_{off1}$ of filter 206 and second cutoff frequency $F_{off2}$ of filter 206 (FIG. 2). In some embodiments, set of control signals 724 include set of control signals CS (FIG. 2).

In one or more embodiments, the storage medium 704 stores instructions 707 for interfacing with external machines. The instructions 707 enable processor 702 to generate instructions readable by the external machines to effectively implement method 400, 500 or 500' during a bandwidth adjusting process of a filter.

Controller 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702. Controller 700 is configured to receive information related to a UI through I/O interface 710. The information is transferred to processor 702 via bus 708 to generate a set of control signals to adjust the bandwidth of the filter. The UI is then stored in computer readable medium 704 as a request to adjust the bandwidth of the filter by a set of control signals 724. Controller 700 is configured to receive information related to a frequency of a signal through I/O interface 710. The information is stored in computer readable medium 704 as frequency of signal 716. Controller 700 is configured to receive information related to a bandwidth of the filter through I/O interface 710. The information is stored in computer readable medium 704 as bandwidth of filter 718. Controller 700 is configured to receive information related to a phase of the signal through I/O interface 710. The information is stored in computer readable medium 704 as phase of the signal 720. Controller 700 is configured to receive information related to cutoff frequencies of the filter through I/O interface 710. The information is stored in computer readable medium 704 as cutoff frequencies of the filter 722.

Figure 8:
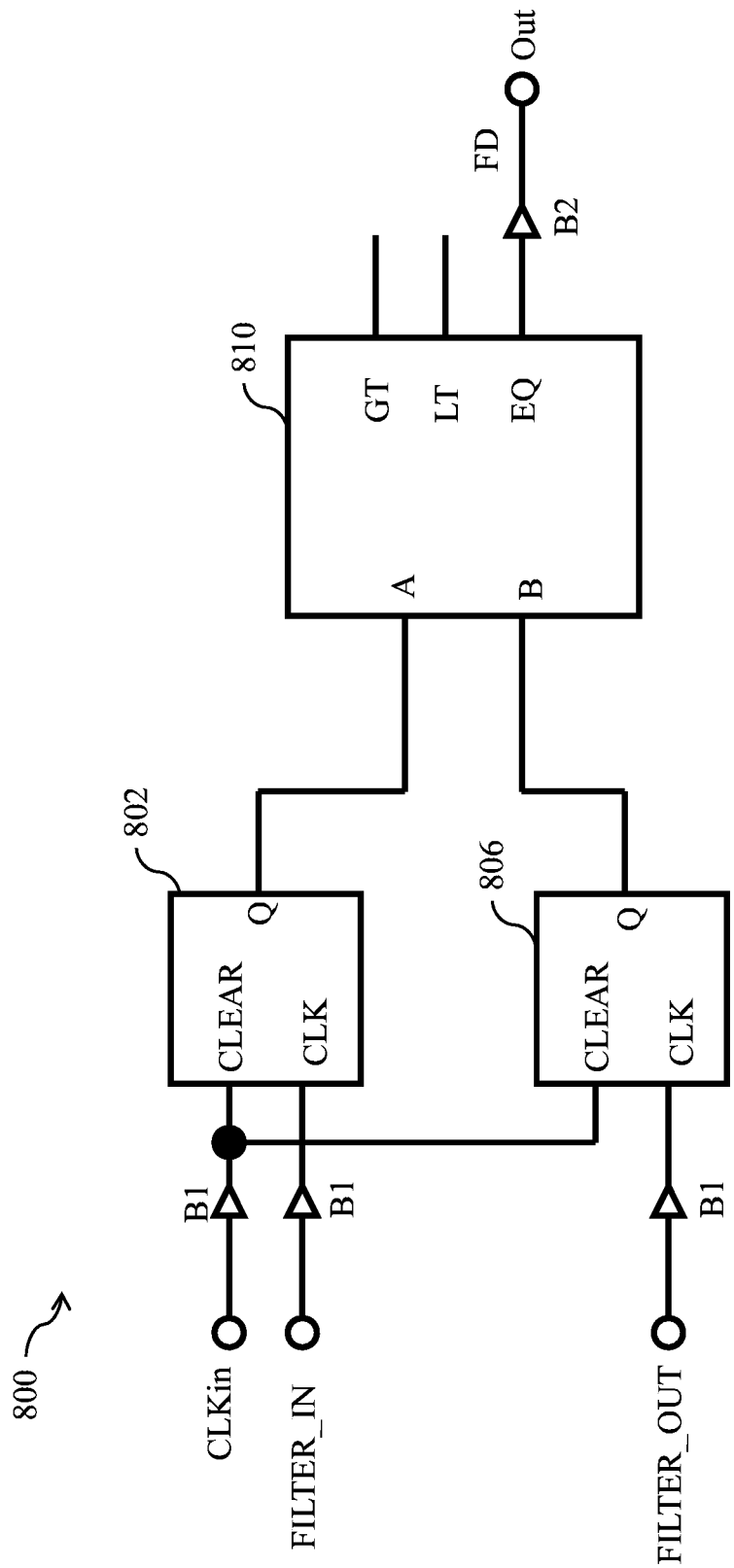
FIG. 8 is a block diagram of a frequency detector usable in the demodulator in FIG. 2, in accordance with some embodiments.

FIG. 8 is a block diagram of a frequency detector 800 usable in the demodulator 200 in FIG. 2, in accordance with some embodiments. Frequency detector 800 is an embodiment of Frequency detector 212 (FIG. 2).

Frequency detector 800 includes a first counter 802, a second counter 804, a comparison logic circuit 810, input buffers B1 and an output buffer B2.

Input buffers B1 are connected to a clear terminal CLEAR and a clock terminal CLK of first counter 802 and second counter 806. Input buffers B1 are configured to delay the signals received on clear terminal CLEAR and clock terminal CLK of first counter 802 and second counter 806.

First counter 802 is connected to second counter 804 and comparison logic circuit 810. First counter 802 is configured to receive a clock signal CLKin on a clear terminal CLEAR. First counter 802 is configured to receive an input signal FILTER_IN on a clock terminal CLK. First counter 802 is configured to measure an oscillation frequency Fin of signal FILTER_IN during a cycle of clock signal CLKin. First counter 802 is configured to output the measured oscillation frequency Fin of signal FILTER_IN to comparison logic circuit 810. In some embodiments, first counter 802 is a ripple counter configured to count the oscillation frequency of Fin of signal FILTER_IN.

The measured oscillation frequency Fin of signal FILTER_IN is a digital signal that includes one or more bits. In some embodiments, signal FILTER_IN corresponds to the mixed data signal MO (FIG. 2). In some embodiments, the measured oscillation frequency Fin of signal FILTER_IN is a measurement of the frequency $F_{mo}$ of mixed data signal MO (FIG. 2).

Second counter 806 is configured to receive a clock signal CLKin on a clear terminal CLEAR. Second counter 806 is configured to receive an input signal FILTER_OUT on a clock terminal CLK. The clock terminal CLK of second counter 806 is connected to the clock terminal CLK of first counter 802. Second counter 806 is configured to measure an oscillation frequency Fout of signal FILTER_OUT during a cycle of clock signal CLKin. Second counter 806 is configured to output the measured oscillation frequency Fout of signal FILTER_OUT to comparison logic circuit 810. In some embodiments, first counter 802 is a ripple counter configured to count the oscillation frequency of Fout of signal FILTER_OUT. In some embodiments, first counter 802 or second counter 804 corresponds to a 4 bit counter.

The measured oscillation frequency Fout of signal FILTER_OUT is a digital signal that includes one or more bits. In some embodiments, signal FILTER_OUT corresponds to the filtered mixed data signal FS (FIG. 2). In some embodiments, the measured oscillation frequency Fout of signal FILTER_OUT is a measurement of the frequency $F_{fs}$ of filtered mixed data signal FS (FIG. 2).

Comparison logic circuit 810 is configured to receive the measured oscillation frequency Fout of signal FILTER_OUT and the measured oscillation frequency Fin of signal FILTER_IN. Comparison logic circuit 810 is configured to compare the measured oscillation frequency Fout of signal FILTER_OUT and the measured oscillation frequency Fin of signal FILTER_IN. Comparison logic circuit 810 is configured to output signal FD on output terminal EQ. Comparison logic circuit 810 also includes output terminals GT and LT. In this embodiment, the data of output terminals GT and LT are not used. In some embodiments, the data of output terminals GT and LT is used. Comparison logic circuit 810 is configured to output signal FD based on the relationship between the measured oscillation frequency Fout of signal FILTER_OUT and the measured oscillation frequency Fin of signal FILTER_IN. In some embodiments, comparison logic circuit 810 corresponds to a 4 bit magnitude comparator.

Output buffer B2 is connected to the output terminal of comparison logic circuit 810. Output buffer B2 is configured to delay signal FD output by second counter 806.

In some embodiments, if the measured oscillation frequency Fout of signal FILTER_OUT is equal to the measured oscillation frequency Fin of signal FILTER_IN, comparison logic circuit 810 is configured to output a first logic value. In some embodiments, if the measured oscillation frequency Fout of signal FILTER_OUT is not equal to the measured oscillation frequency Fin of signal FILTER_IN, comparison logic circuit 810 is configured to output a second logic value. The first logic value is the inverse of the second logic value. The first logic value is a logically low signal or a logically high signal. The second logic value is a logically low signal or a logically high signal.

Figure 9:
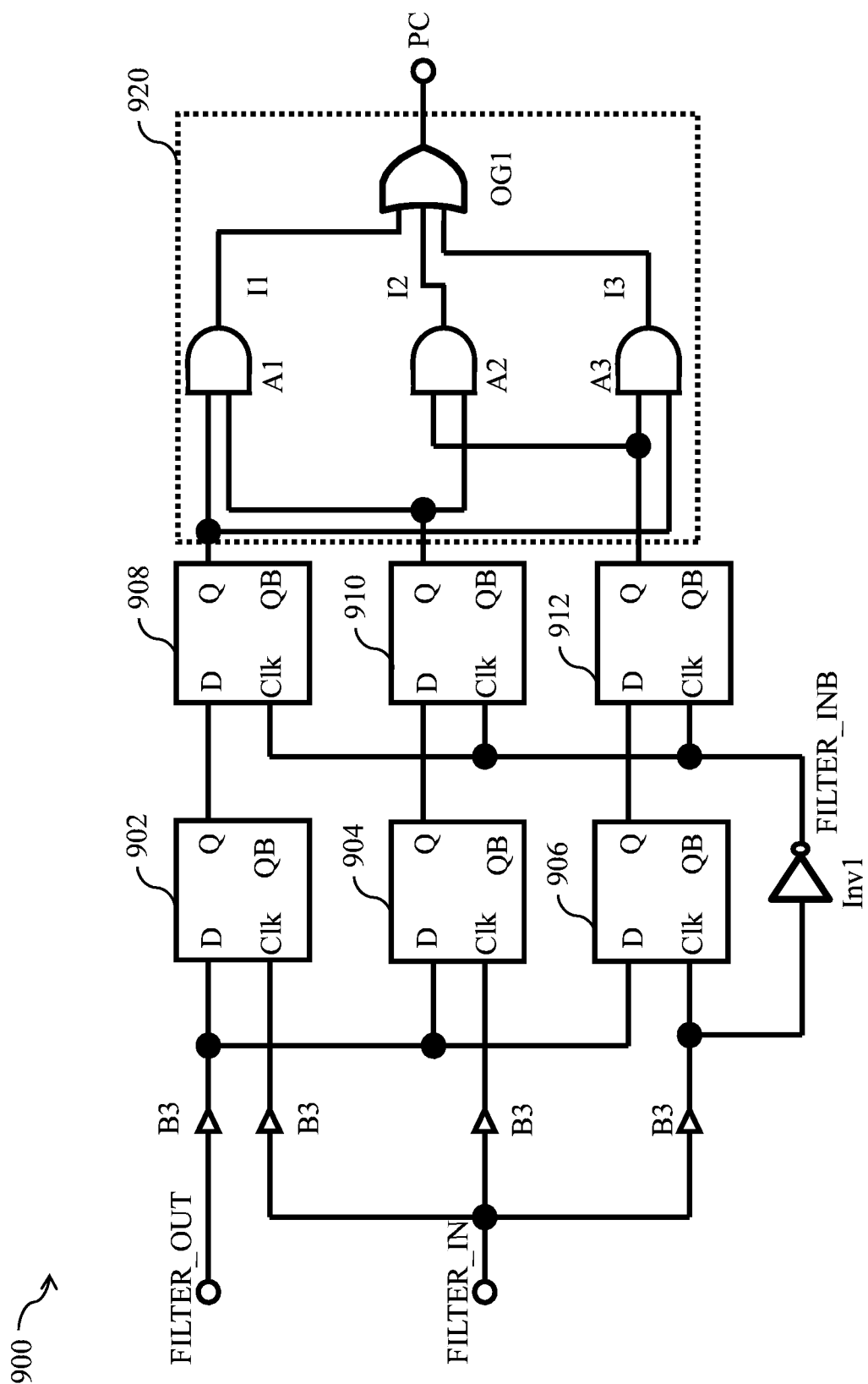
FIG. 9 is a block diagram of a phase comparator usable in the demodulator in FIG. 2, in accordance with some embodiments.

FIG. 9 is a block diagram of a phase comparator usable in the demodulator in FIG. 2, in accordance with some embodiments. Phase comparator 900 is an embodiment of phase comparator 210 (FIG. 2).

Phase comparator 900 includes input buffers B3, a first flip-flop 902, a second flip-flop 904, a third flip-flop 906, a fourth flip-flop 908, a fifth flip-flop 910, a sixth flip-flop 912, an inverter INV1 and a logic device 920.

Each flip-flop of FIG. 9 (e.g., first flip-flop 902, second flip-flop 904, third flip-flop 906, fourth flip-flop 908, fifth flip-flop 910, sixth flip-flop 912) comprises an input terminal D, a clock input terminal CLK, an output terminal Q and an output terminal QB. Output terminal QB is a logically inverted version of output terminal Q. While FIG. 9 shows that phase comparator 900 includes D flip-flops, phase comparator 900 can be implemented with other flip-flop types.

Input buffers B3 are connected to the input terminals of each flip-flop of FIG. 9 (e.g., first flip-flop 902, second flip-flop 904, third flip-flop 906, fourth flip-flop 908, fifth flip-flop 910, sixth flip-flop 912). Input buffers B3 are configured to delay the signals received on the input terminals of each flip-flop of FIG. 9 (e.g., first flip-flop 902, second flip-flop 904, third flip-flop 906, fourth flip-flop 908, fifth flip-flop 910, sixth flip-flop 912).

First flip-flop 902 is connected to second flip-flop 904, third flip-flop 906, fourth flip-flop 908 and inverter INV1.

Each input terminal D of first flip-flop 902, second flip-flop 904 and third flip-flop 906 are connected to each other and are configured to receive the same input signal (input signal FILTER_OUT). In some embodiments, signal FILTER_OUT corresponds to the filtered mixed data signal FS including phase $PHI_{fs}$ (FIG. 2).

Each clock input terminal CLK of first flip-flop 902, second flip-flop 904 and third flip-flop 906 are connected to each other and are configured to receive the same input signal (input signal FILTER_IN). In some embodiments, signal FILTER_IN corresponds to the mixed data signal MO including phase $PHI_{mo}$ (FIG. 2). In some embodiments, phase $PHI_{mo}$ is offset from phase $PHI_{fs}$ by at least 90 degrees.

Output terminal Q of first flip-flop 902, second flip-flop 904 and third flip-flop 906 are configured to output stored input signal FILTER_OUT based on signal FILTER_IN received by the clock input terminal CLK. The output terminal Q of each of first, second, and third flip-flops 902, 904, 906 is connected with the input D terminal of a corresponding fourth, fifth, sixth flip-flops 908, 910, 912.

An input terminal of inverter I1 is connected to the clock input terminal CLK of first flip-flop 902, second flip-flop 904 and third flip-flop 906. An output terminal of inverter I2 is connected to a clock input terminal CLK of fourth flip-flop 908, fifth flip-flop 910 and sixth flip-flop 912. Inverter I1 is configured to receive input signal FILTER_IN and to output inverted input signal FILTER_INB.

Each input terminal D of the fourth, fifth, and sixth flip-flops 908, 910, 912 is connected to a corresponding output terminal Q of first, second, and third flip-flops 902, 904, 906 and configured to receive stored input signal FILTER_OUT from the corresponding flip-flop.

Each clock input terminal CLK of fourth flip-flop 908, fifth flip-flop 910 and sixth flip-flop 912 are connected to each other and configured to receive a same inverted input signal FILTER_INB from inverter I1. In some embodiments, signal FILTER_INB corresponds to an inverted version of mixed data signal MO (FIG. 2).

Output terminal Q of fourth flip-flop 908, fifth flip-flop 910 and sixth flip-flop 912 are configured to output stored signal FILTER_IN based on signal FILTER_INB received by the clock input terminal CLK.

Logic device 920 is connected to output terminal Q of fourth flip-flop 908, fifth flip-flop 910 and sixth flip-flop 912. Logic device 920 is configured to receive stored signal FILTER_IN. Logic device 920 is configured to output signal PC. Output signal PC corresponds to output signal PC generated by phase comparator 210 described in FIG. 2.

Logic device 920 includes an AND gate A1, an AND gate A2, an AND gate A3 and an OR gate OR1.

AND gate A1 is also connected to output terminal Q of fourth flip-flop 908 and output terminal Q of fifth flip-flop 910. AND gate A1 is configured to receive stored signal FILTER_IN from the output terminal Q of fourth flip-flop 908 and stored signal FILTER_IN from the output terminal Q of fifth flip-flop 910. AND gate A1 is configured to output a signal I1 to OR gate OG1.

AND gate A2 is also connected to output terminal Q of output terminal Q of fifth flip-flop 910 and output terminal Q of sixth flip-flop 912. AND gate A2 is configured to receive stored signal FILTER_IN from the output terminal Q of fifth flip-flop 910 and stored signal FILTER_IN from the output terminal Q of sixth flip-flop 912. AND gate A2 is configured to output a signal I2 to OR gate OG1.

AND gate A3 is also connected to output terminal Q of output terminal Q of fourth flip-flop 908 and output terminal Q of sixth flip-flop 912. AND gate A3 is configured to receive stored signal FILTER_IN from the output terminal Q of fourth flip-flop 908 and stored signal FILTER_IN from the output terminal Q of sixth flip-flop 912. AND gate A3 is configured to output a signal I3 to OR gate OG1.

OR gate OG1 is configured to receive stored signals I1, I2 and I3 from each corresponding AND gate A1, A2 and A3. OR gate OG1 is configured to output signal PC.

By using demodulators DM[1], DM[2] and DM[N] (FIG. 1) or demodulator 200 (FIG. 2), the bandwidth of a filter (e.g., filters $Filter_1$, $Filter_2$, and $Filter_N$, (FIG. 1), filter 206, filter 300 (FIG. 3A) is adjusted to overcome any signal distortion attributed to PVT variations. In some embodiments, the bandwidth of the filter (e.g., filters $Filter_1$, $Filter_2$, and $Filter_N$, (FIG. 1), filter 206 (FIG. 2), filter 300 (FIG. 3A) is automatically adjusted or automatically calibrated to overcome any signal distortion attributed to PVT variations.

By using method 400 (FIG. 4A), method 400' (FIG. 4B) or method 500 (FIG. 5), the bandwidth of a filter (e.g., filters $Filter_1$, $Filter_2$, and $Filter_N$, (FIG. 1), filter 206 (FIG. 2), filter 300 (FIG. 3A) is adjusted to overcome any signal distortion attributed to PVT variations.

One aspect of this description relates to a communication system. The communication system includes a first amplifier configured to output an amplified modulated signal, and a demodulator coupled to the first amplifier. The demodulator is configured to demodulate the amplified modulated signal responsive to a first carrier signal. The demodulator includes a filter and a bandwidth adjusting circuit. The filter is configured to generate a filtered first signal based on a first signal and a set of control signals. The first signal is a product of a first carrier signal and the amplified modulated signal. The filter has a bandwidth adjusted based on the set of control signals. The bandwidth adjusting circuit is coupled to the filter, and is configured to generate the set of control signals based on at least a frequency of the filtered first signal and a frequency of the first signal. The bandwidth adjusting circuit includes a frequency detector coupled to the filter, and configured to generate a second signal based on a relationship between the frequency of the filtered first signal and the frequency of the first signal.

Another aspect of this description relates to communication system. The communication system includes a first carrier generator configured to generate a first carrier signal, and a demodulator coupled to the first carrier generator. The demodulator is configured to demodulate a modulated signal responsive to the first carrier signal. The demodulator includes a mixer, a filter and a bandwidth adjusting circuit. The mixer is coupled to at least the first carrier generator, and is configured to generate a first signal based on the first carrier signal and the modulated signal. The filter is coupled to the mixer, and is configured to generate a filtered first signal based on at least the first signal. The filter has a bandwidth adjusted by a set of control signals. The bandwidth adjusting circuit is coupled to at least the filter, and is configured to generate the set of control signals based on a frequency of the filtered first signal and a frequency of the first signal. The bandwidth adjusting circuit includes a frequency detector coupled to the filter, and is configured to generate a second signal based on a frequency relationship between the frequency of the filtered first signal and the frequency of the first signal.

Still another aspect of this description relates to a method of data communications. The method includes receiving a modulated signal through a first transmission line; and demodulating the modulated signal responsive to a first carrier signal, thereby generating a first demodulated data stream. Demodulating the modulated signal includes generating, by a mixer, a first signal based on the first carrier signal and the modulated signal, the first signal being a product of the first carrier signal and the modulated signal; generating, by a filter, a filtered first signal by filtering the first signal; generating a set of control signals based on at least a frequency of the filtered first signal and a frequency of the first signal, and adjusting a bandwidth of the filter based on the set of control signals. The generating the set of control signals includes generating, by a frequency detector, a second signal based on a relationship between the frequency of the filtered first signal and the frequency of the first signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A communication system, comprising:
a first amplifier configured to output an amplified modulated signal; and
a demodulator coupled to the first amplifier, and configured to demodulate the amplified modulated signal responsive to a first carrier signal, the demodulator comprising:
a filter configured to generate a filtered first signal based on a first signal and a set of control signals, the first signal being a product of a first carrier signal and the amplified modulated signal, the filter having a bandwidth adjusted based on the set of control signals; and
a bandwidth adjusting circuit coupled to the filter, and configured to generate the set of control signals based on at least a frequency of the filtered first signal and a frequency of the first signal, the bandwidth adjusting circuit comprising:
a frequency detector coupled to the filter, and configured to generate a second signal based on a relationship between the frequency of the filtered first signal and the frequency of the first signal.

2. The communication system of claim 1, further comprising:
a second amplifier coupled to the first amplifier by a transmission line, and configured to generate a first amplified signal responsive to a modulated signal; and
a modulator coupled to the second amplifier, and configured to generate the modulated signal responsive to a second carrier signal,
wherein the first amplifier is configured to output the amplified modulated signal based on the first amplified signal.

3. The communication system of claim 2, further comprising:
a carrier generator coupled to the modulator, and configured to generate the second carrier signal.

4. The communication system of claim 1, wherein the frequency detector comprises:
a first counter having a first terminal, a second terminal, and a third terminal, the first terminal of the first counter being coupled to the filter and configured to receive the filtered first signal, the second terminal of the first counter being configured to receive a clock signal, and the third terminal of the first counter being configured to output the frequency of the filtered first signal;
a second counter having a first terminal, a second terminal, and a third terminal, the first terminal of the second counter being configured to receive the first signal, the second terminal of the second counter being configured to receive the clock signal, and the third terminal of the second counter being configured to output the frequency of the first signal;
a comparison logic circuit having a first input terminal, a second input terminal, and a first output terminal, the first input terminal of the comparison logic circuit being coupled to the third terminal of the first counter and configured to receive the frequency of the filtered first signal, the second input terminal of the comparison logic circuit being coupled to the third terminal of the second counter and configured to receive the frequency of the first signal, and the first output terminal of the comparison logic circuit being configured to output a third signal; and
an output buffer coupled to the first output terminal of the comparison logic circuit, and configured to output the second signal based on the third signal.

5. The communication system of claim 1, wherein the bandwidth adjusting circuit further comprises:
a phase comparator configured to detect a phase relationship between a phase of the filtered first signal and a phase of the first signal, the phase comparator being configured to output the phase relationship between the phase of the filtered first signal and the phase of the first signal.

6. The communication system of claim 5, wherein the phase comparator comprises:
a set of input buffers configured to receive the filtered first signal and the first signal;
a first set of flip-flops coupled to the set of input buffers, and configured to output a third signal based on the filtered first signal and the first signal;
a second set of flip-flops coupled to the first set of flip-flops, and configured to output a fourth signal based on the third signal; and
a logic device coupled to the second set of flip-flops, and configured to output the phase relationship between the phase of the filtered first signal and the phase of the first signal based on the fourth signal.

7. The communication system of claim 6, wherein the logic device comprises:
a set of NAND logic gates coupled to the second set of flip-flops, and configured to output a first set of signals based on the fourth signal; and
an OR logic device coupled to the set of NAND logic gates, and configured to output the phase relationship between the phase of the filtered first signal and the phase of the first signal based on the first set of signals.

8. The communication system of claim 5, wherein the bandwidth adjusting circuit further comprises:
a controller configured to generate the set of control signals based on: the phase relationship between the phase of the filtered first signal and the phase of the first signal, or the second signal.

9. A communication system, comprising:
a first carrier generator configured to generate a first carrier signal; and
a demodulator coupled to the first carrier generator, and configured to demodulate a modulated signal responsive to the first carrier signal, the demodulator comprising:
a mixer coupled to at least the first carrier generator, and configured to generate a first signal based on the first carrier signal and the modulated signal;
a filter coupled to the mixer, and configured to generate a filtered first signal based on at least the first signal, the filter having a bandwidth adjusted by a set of control signals; and
a bandwidth adjusting circuit coupled to at least the filter, and configured to generate the set of control signals based on a frequency of the filtered first signal and a frequency of the first signal, the bandwidth adjusting circuit comprising:
a frequency detector coupled to the filter, and configured to generate a second signal based on a frequency relationship between the frequency of the filtered first signal and the frequency of the first signal.

10. The communication system of claim 9, wherein the frequency detector comprises:
a set of input buffers coupled to the filter and the mixer, and configured to receive the filtered first signal and the first signal, and to output a third signal, a fourth signal and a fifth signal;
a set of counters coupled to the set of input buffers, configured to receive the third signal, the fourth signal and the fifth signal, and configured to output the frequency of the filtered first signal and the frequency of the first signal;
a comparison logic circuit coupled to the set of counters, and being configured to output a sixth signal based on the frequency of the filtered first signal and the frequency of the first signal; and
an output buffer coupled to the comparison logic circuit, and configured to output the second signal based on the sixth signal.

11. The communication system of claim 9, wherein the bandwidth adjusting circuit further comprises:
a phase comparator configured to detect a phase relationship between a phase of the filtered first signal and a phase of the first signal, the phase comparator being configured to output the phase relationship between the phase of the filtered first signal and the phase of the first signal.

12. The communication system of claim 11, wherein phase comparator comprises:
a set of input buffers coupled to the filter and the mixer, and configured to receive the filtered first signal and the first signal;
a first set of flip-flops coupled to the set of input buffers, and configured to output a third signal based on the filtered first signal and the first signal;

a second set of flip-flops coupled to the first set of flip-flops, and configured to output a fourth signal based on the third signal;
a set of NAND logic gates coupled to the second set of flip-flops, and configured to output a first set of signals based on the fourth signal; and
an OR logic device coupled to the set of NAND logic gates, and configured to output the phase relationship between the phase of the filtered first signal and the phase of the first signal based on the first set of signals.

13. The communication system of claim 11, wherein the bandwidth adjusting circuit further comprises:
a controller configured to generate the set of control signals based on: the phase relationship between the phase of the filtered first signal and the phase of the first signal, or the second signal.

14. The communication system of claim 9, further comprising:
a second carrier generator coupled to the first carrier generator, and configured to generate a second carrier signal; and
a modulator coupled to the demodulator, and configured to generate the modulated signal responsive to the second carrier signal and a data signal.

15. A method of data communications, comprising:
receiving a modulated signal through a first transmission line; and
demodulating the modulated signal responsive to a first carrier signal, thereby generating a first demodulated data stream, wherein the demodulating the modulated signal comprises:
generating, by a mixer, a first signal based on the first carrier signal and the modulated signal, the first signal being a product of the first carrier signal and the modulated signal;
generating, by a filter, a filtered first signal by filtering the first signal;
generating a set of control signals based on at least a frequency of the filtered first signal and a frequency of the first signal, the generating the set of control signals comprises:
generating, by a frequency detector, a second signal based on a relationship between the frequency of the filtered first signal and the frequency of the first signal; and
adjusting a bandwidth of the filter based on the set of control signals.

16. The method of data communications of claim 15, further comprising:
storing the set of control signals associated with the adjusting the bandwidth of the filter.

17. The method of data communications of claim 15, wherein
the relationship between the frequency of the filtered first signal and the frequency of the first signal comprises:
a difference between the frequency of the filtered first signal and the frequency of the first signal; and
the adjusting the bandwidth of the filter based on the set of control signals comprises:
adjusting the bandwidth of the filter based on the set of control signals until at least one condition is satisfied.

18. The method of data communications of claim 17, wherein the at least one condition is satisfied when:
a phase difference between a phase of the filtered first signal and a phase of the first signal is greater than 90 degrees, or the frequency of the filtered first signal is equal to the frequency of the first signal.

19. The method of data communications of claim 15, wherein generating the set of control signals further comprises:
   detecting a phase relationship between a phase of the filtered first signal and a phase of the first signal; and
   outputting the phase relationship between the phase of the filtered first signal and the phase of the first signal.

20. The method of data communications of claim 19, wherein the phase relationship comprises a phase difference between the phase of the filtered first signal and the phase of the first signal.

* * * * *